US010846664B2

(12) United States Patent
Myshkin et al.

(10) Patent No.: US 10,846,664 B2
(45) Date of Patent: Nov. 24, 2020

(54) SECURE ELECTRONIC SYSTEM FOR MANAGING DIGITAL CURRENCIES

(71) Applicant: Alchemy Tech LLC, Los Angeles, CA (US)

(72) Inventors: Dmitriy Olegovitch Myshkin, Atlanta, GA (US); Brandon Michael Allen, San Clemente, CA (US)

(73) Assignee: AIM IP, LLC, Mission Viejo, CA (US)

( * ) Notice: Subject to any disclaimer, the term of this patent is extended or adjusted under 35 U.S.C. 154(b) by 107 days.

(21) Appl. No.: 15/924,095

(22) Filed: Mar. 16, 2018

(65) Prior Publication Data

US 2018/0341931 A1     Nov. 29, 2018

Related U.S. Application Data

(60) Provisional application No. 62/511,659, filed on May 26, 2017.

(51) Int. Cl.
*G06Q 20/06* (2012.01)
*H04L 9/32* (2006.01)
*H04L 9/08* (2006.01)

(52) U.S. Cl.
CPC ....... *G06Q 20/0658* (2013.01); *H04L 9/0894* (2013.01); *H04L 9/3236* (2013.01); *H04L 9/3247* (2013.01); *H04L 2209/38* (2013.01); *H04L 2209/56* (2013.01)

(58) Field of Classification Search
CPC ................................................. G06Q 20/0658
See application file for complete search history.

(56) References Cited

U.S. PATENT DOCUMENTS

2015/0170112 A1* 6/2015 DeCastro ............. G06Q 20/381
                                                                705/39
2016/0335628 A1* 11/2016 Weigold ............. G06Q 20/3829

OTHER PUBLICATIONS

Gentilal, et al., 2017, "TrustZone-backed Bitcoin Wallet," IEEE (Year: 2017).*

* cited by examiner

*Primary Examiner* — Olabode Akintola
*Assistant Examiner* — Brandon M Duck
(74) *Attorney, Agent, or Firm* — Farjami & Farjami LLP

(57) ABSTRACT

A secure electronic system for storing and managing receipt and releasing of electronic documents, such as cryptocurrencies, digital currencies, tokens, and smart contracts, includes a platform server, a secure computer, and a non-IP protocol for communication between the secure computer and the platform server. The secure computer includes a plurality of cold memory modules and at least one hot memory module. The secure computer powers up and makes hot one or more of the plurality of the cold memory modules upon detecting and empty condition or a full condition. The secure computer includes a rate limiter that restricts releasing of hot electronic documents, such as cryptocurrencies, digital currencies, tokens, and smart contracts, stored in the at least one hot memory module. The non-IP protocol is known only to authorized administrators or operators of the secure electronic system. The secure computer provides access to the platform server only through the non-IP protocol.

16 Claims, 12 Drawing Sheets

SECURE ELECTRONIC SYSTEM FOR MANAGING DIGITAL CURRENCIES

The present application claims the benefit of and priority to a provisional application entitled "Secure Cryptocurrency Storage and Banking Solution," Ser. No. 62/511,659 filed on May 26, 2017. The disclosure in this provisional application is hereby incorporated fully by reference into the present application.

BACKGROUND

Networked computer systems are extensively used for creating, verifying, managing, storing, and transferring documents of value, such as cryptocurrencies and smart contracts between authorized users of the networks. Such authorized users may be network administrators or individuals or institutions that have various levels of authorized access to the network for the purpose of managing the network or conducting transactions utilizing cryptocurrencies or smart contracts.

Cryptocurrencies and smart contracts provide numerous advantages over traditional fiat currency and manual contracts in their creation, verification, management and storage, such as improved document verification, immutability, speed of access and speed of transactions, transaction costs, and worldwide access. Networked electronic systems used for managing cryptocurrencies, digital currencies, tokens, and smart contracts often provide some form of security to rival the access limitations provided by traditional systems used for managing fiat currency.

Public/private key cryptography is a common form of security, wherein a private key known only to an authorized user permits access to the user's account. However, private keys and account information are vulnerable to hacking. For example, hackers can transfer cryptocurrencies to themselves and validate transactions using stolen private keys, making the transactions indistinguishable from transactions by an authorized user. An entire repository of cryptocurrencies may be vulnerable to theft in this manner. Because cryptocurrency transactions generally cannot be reversed, when the repository is hacked, its operators must shut down the exchange or banking services. Conventional electronic and computer systems that are used for storing cryptocurrencies and managing transactions based on cryptocurrencies and smart contracts provide little safeguard against hacking of individual accounts or even large scale theft of an entire repository of cryptocurrencies.

SUMMARY

The present disclosure is directed to a secure electronic system for managing digital currencies, substantially as shown in and/or described in connection with at least one of the figures, and as set forth in the claims.

DETAILED DESCRIPTION

Figure 1:
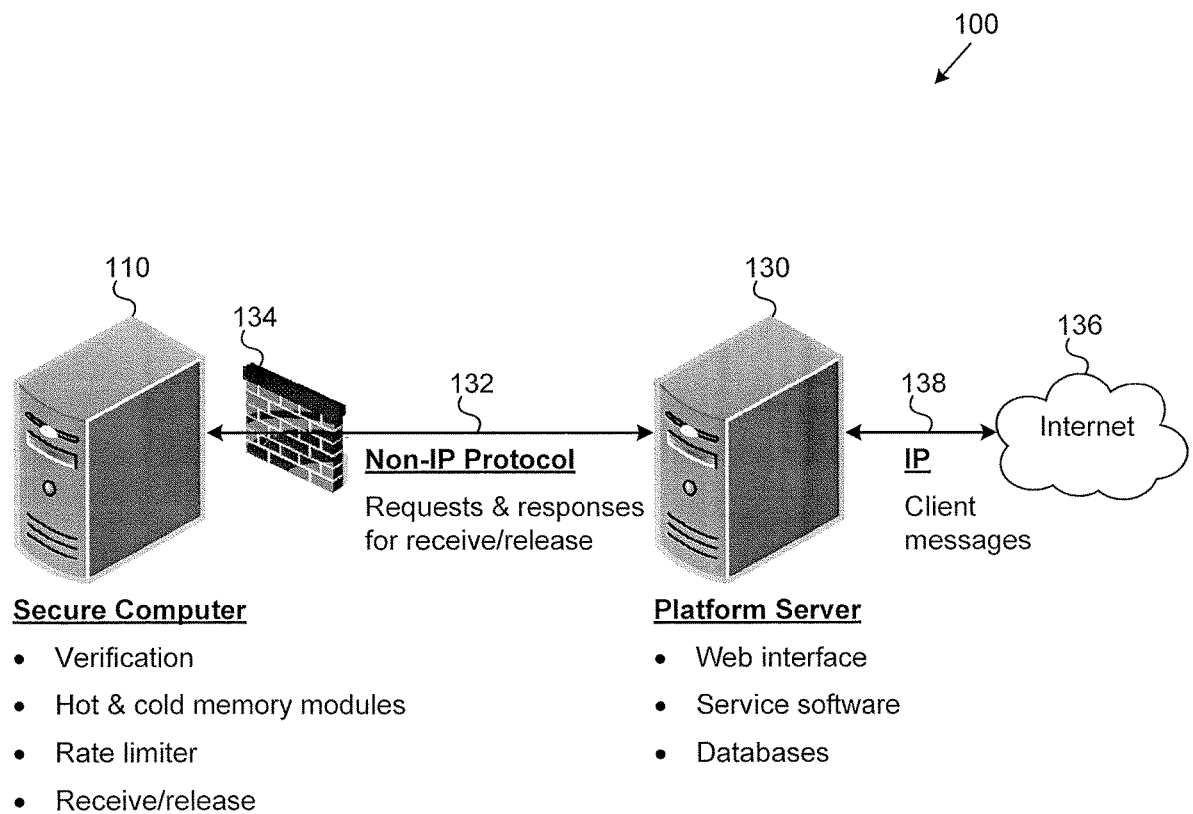
FIG. 1 illustrates a diagram of a portion of an exemplary secure electronic system for creation, verification, management and storage of electronic documents according to one implementation of the present application.

The following description contains specific information pertaining to implementations of the present disclosure. The drawings in the present application and their accompanying detailed description are directed to merely exemplary implementations. Unless noted otherwise, like or corresponding elements among the figures may be indicated by like or corresponding reference numerals.

FIG. 1 illustrates a diagram of a portion of an exemplary secure system 100 for creation, verification, management and storage of electronic documents such as cryptocurrencies, digital currencies, tokens, and smart contracts according to one implementation of the present application. As used in the present application, "electronic documents" may refer to any electronic representation capable of being stored. Electronic documents can be cryptocurrencies, digital currencies, tokens, or smart contracts. Electronic documents can also be public or private keys, such as public or private keys utilized in a cryptocurrency network. System 100 shown in FIG. 1 is referred to hereinafter as secure electronic system 100 for ease of reference. As illustrated in FIG. 1, secure electronic system 100 includes secure computer 110, platform server 130, secure connection 132 which may be a non-IP protocol communication link, firewall 134, Internet 136, and connection 138.

Secure electronic system 100 may provide an online banking service or an over-the-counter (OTC) electronic market service, an electronic exchange, or a repository for authorized users by utilizing cryptocurrencies, digital currencies, tokens, smart contracts and the like. Platform server 130 is a networked computer hosting various services and features. In the present implementation, platform server 130 hosts a web interface, primary service software, and related databases. In the present implementation, platform server 130 is connected to the Internet through connection 138 and provides service to users over Internet 136. Connection 138 uses an Internet Protocol (IP), such as IPv4 or IPv6. In other implementations, platform server 130 may provide service to users through another protocol, such as secure shell (SSH). For ease of description, platform server 130 is shown as a single server, but it is understood that multiple servers can form a private or hardwired network of servers and act as a single platform server 130.

Secure computer 110 is a computer that provides access only to platform server 130, and other platform servers that are securely set up to communicate with secure computer 110, and safeguards the more sensitive features of the service. For ease of description, secure computer 110 is shown as a single computer, but it is understood that multiple computers can form a private or hardwired network and act as a single secure computer 110. As described below, secure computer 110 hosts hot and cold memory modules, a rate limiter, a signature verification block, and a receive/release block, which are useful to eliminate or significantly reduce several points of failure or vulnerabilities of conventional electronic systems. In one implementation, the memory modules are referred to as wallets or digital wallets for storing and conducting cryptocurrency transactions. In this implementation, hot and cold memory modules would be referred to as hot and cold wallets or hot and cold digital wallets respectively.

In the present implementation, secure computer 110 provides access only to platform server 130, and only for specific limited functions. In the present implementation, these functions are limited to responding to requests for receiving and releasing cryptocurrencies, digital currencies, tokens, smart contracts, and account information such as public and private keys of authorized users. Secure computer 110 provides access to platform server 130 only through secure connection 132, which may be a communication link using a non-IP protocol known only to authorized operators and administrators of secure electronic system 100. Firewall 134 also monitors and controls communications between secure computer 110 and platform server 130.

Figure 2:
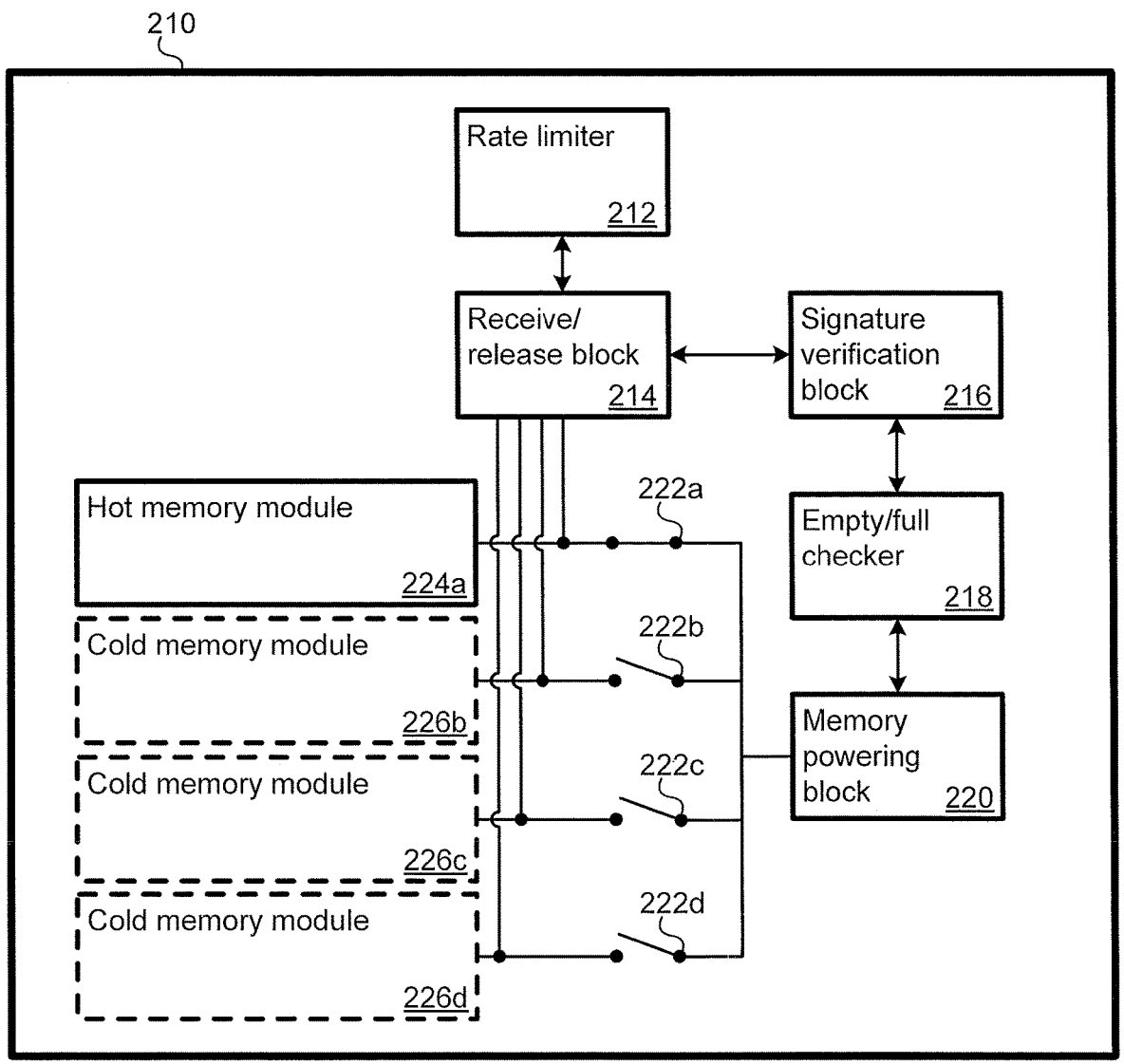
FIG. 2 illustrates a diagram of a portion of an exemplary secure computer according to one implementation of the present application.

FIG. 2 illustrates a diagram of a portion of an exemplary secure computer that can be used in secure electronic system 100 according to one implementation of the present application. As illustrated in FIG. 2, secure computer 210 includes rate limiter 212, receive/release block 214, signature verification block 216, empty/full checker 218, memory powering block 220, switches 222a, 222b, 222c, and 222d, collectively referred to as switches 222, hot memory module 224a, and cold memory modules 226b, 226c, and 226d. In one implementation, memory modules are referred to as wallets or digital wallets for storing and conducting cryptocurrency transactions. In this implementation, hot memory module 224a would be referred to as hot wallet or hot digital wallet 224a, while cold memory modules 226b, 226c, and 226d would be referred to as cold wallets or cold digital wallets 226b, 226c, and 226d.

Receive/release block 214 enables secure computer 210 to respond to requests for receipt and/or release of cryptocurrencies, digital currencies, tokens, smart contracts, and in general electronic documents of interest to an authorized user. Receive/release block 214 can receive these requests from another networked computer, such as platform server 130 in FIG. 1. Receive/release block 214 includes a non-IP network interface controller that enables it to receive and respond to requests over a non-IP communication link, such as secure connection 132 in FIG. 1.

In response to a request for receipt of cryptocurrencies, digital currencies, tokens, smart contracts, and in general electronic documents from a depositing authorized user, receive/release block 214 can store the cryptocurrencies, digital currencies, tokens, smart contracts, and in general electronic documents in a hot memory module (or a hot wallet), such as hot memory module 224a (or hot wallet 224a). In response to a request for release of cryptocurrencies, digital currencies, tokens, smart contracts, and in general electronic documents from a withdrawing authorized user, receive/release block 214 can remove the cryptocurrencies, digital currencies, tokens, smart contracts, and in general electronic documents from a hot memory module (or a hot wallet), such as hot memory module 224a (or hot wallet 224a), and send the electronic documents in a response message. Receive/release block 214 can also send a response message confirming deposit or withdrawal.

Hot memory module 224a (or hot wallet 224a) is a non-volatile memory module that is powered up so that it can be accessed by secure computer 210, as opposed to cold memory modules 226b, 226c, and 226d (or cold wallets 226b, 226c, and 226d) that are powered down and cannot be accessed by secure computer 210. As such, electronic documents, such as digital currencies, cryptocurrencies, tokens, smart contracts, or public or private keys can be added to or removed from (read from) hot memory module 224a (or hot wallet 224a), i.e. the quantity of electronic documents stored in hot memory module 224a (or hot wallet 224a) can be changed (can be increased or decreased). In contrast, the same cannot be true for cold memory modules 226b, 226c, and 226d (or cold wallets 226b, 226c, and 226d), in that electronic documents, such as cryptocurrencies, digital currencies, tokens, smart contracts, or public or private keys stored therein cannot be accessed and are immune to hacking or unauthorized access, i.e. the quantity of electronic documents stored in cold memory modules 226b, 226c, and 226d cannot be, changed (cannot be increased or decreased). As used herein, "quantity" or "quantities" may refer to quantities and/or values of cryptocurrencies, digital currencies, smart contracts, tokens, and/or private or public keys.

Hot memory module 224a (or hot wallet 224a) can be any non-volatile memory, such as non-volatile random access memory (NVRAM), NAND or NOR flash memory, a solid state drive and the like. Memory powering block 220 powers up hot memory module 224a (or hot wallet 224a). As illustrated in FIG. 2, hot memory module 224a (or hot wallet 224a) is connected to memory powering block 220 through switch 222a being closed. In the present implementation, when receive/release block 214 receives incoming additional cryptocurrencies, digital currencies, tokens, smart contracts, or public or private keys from a depositing authorized user, receive/release block 214 can store the incoming additional cryptocurrencies, digital currencies, tokens, smart contracts, or public or private keys in hot memory module 224a (or hot wallet 224a). Similarly, when a withdrawing authorized user requests release of cryptocurrencies, digital currencies, tokens, smart contracts, or public or private keys, receive/release block 214 can remove the cryptocurrencies, digital currencies, tokens, smart contracts, or public or private keys from hot memory module 224a (or hot wallet 224a), and release them in a response over a non-IP communication link to another computer, such as platform server 130 in FIG. 1. In other implementations, secure computer 210 can remove cryptocurrencies, digital currencies, tokens, smart contracts, or public or private keys stored in hot memory module 224a (or hot wallet 224a), and store them in another hot memory module (or another hot wallet not shown in FIG. 2), for example, to provide load balancing before memory powering block 220 powers down the other hot memory module (or the other hot wallet).

Cold memory modules 226b, 226c, and 226d (or cold wallets 226b, 226c, and 226d) can be any non-volatile memory, such as non-volatile random access memory (NVRAM), NAND or NOR flash memory, a solid state drive and the like. Unlike hot memory module 224a (or hot wallet 224a), cold memory modules 226b, 226c, and 226d (or cold wallets 226b, 226c, and 226d) are powered down and cannot be accessed by receive/release block 214 in response to a request for receipt and/or release of cryptocurrencies, digital currencies, tokens, smart contracts, or public or private keys. As illustrated in FIG. 2, cold memory modules 226b, 226c, and 226d (or cold wallets 226b, 226c, and 226d) are disconnected from memory powering block 220 due to switches 222b, 222c, and 222d, respectively, being open. Although FIG. 2 illustrates switches 222 as single pole single throw switches between memory powering block 220 and hot memory module 224a (or hot wallet 224a) or cold memory modules 226b, 226c, and 226d (or cold wallets 226b, 226c, and 226d), in other implementations, complex switches, capacitors, and generally any circuit configurations can be used for powering up, powering down, and regulating power to hot memory module 224a (or hot wallet 224a) or cold memory modules 226b, 226c, and 226d (or cold wallets 226b, 226c, and 226d).

In the implementation shown in FIG. 2, secure computer 210 includes four memory modules, i.e. one hot memory module 224a (or one hot wallet 224a) and three cold memory modules 226b, 226c, and 226d (or three cold wallets 226b, 226c, and 226d). In other implementations, secure computer 210 can include any other number of memory modules. For example, secure computer 210 can include ten memory modules, i.e. one hot memory module (or one hot wallet) and nine cold memory modules (or nine cold wallets), so as to increase the memory space available for storing cryptocurrencies, digital currencies, tokens, smart contracts, or public or private keys. In one implementation, an authorized operator or administrator of secure computer 210 may manually connect additional memory modules (or additional wallets) to secure computer 210.

In the present implementation, secure computer 210 includes only one hot memory module 224a (or only one hot wallet 224a) that is powered up. As a result, receive/release block 214 can only release cryptocurrencies, digital currencies, tokens, smart contracts, or public or private keys stored in hot memory module 224a (or hot wallet 224a). In the event of a hack that generates fraudulent release requests, receive/release block 214 cannot release cryptocurrencies, digital currencies, tokens, smart contracts, or public or private keys from cold memory modules 226b, 226c, and 226d (or cold wallets 226b, 226c, and 226d) since those modules are powered off and cannot be accessed or read from or written into. In other implementations, more than one hot memory module (or hot wallet) can be powered up. For example, secure computer 210 can include two hot memory modules (or two hot wallets) and two cold memory modules (or two cold wallets), so as to increase the quantity of cryptocurrencies, digital currencies, tokens, smart contracts, or public or private keys that can be accessed by receive/release block 214. In one implementation, secure computer 210 ensures that a cold quantity of cryptocurrencies, digital currencies, tokens, smart contracts, or public or private keys stored in cold memory modules (or cold wallets) is greater than a hot quantity of electronic documents, such as cryptocurrencies, digital currencies, tokens, smart contracts, or public or private keys stored in hot memory modules (or hot wallets). It is noted that the "cold quantity of electronic documents" is also referred to as a "cold quantity of cold electronic documents" and, similarly, the "hot quantity of electronic documents" is also referred to as a "hot quantity of hot electronic documents" in the present application. Thus, receive/release block 214 cannot release the majority of the cryptocurrencies, digital currencies, tokens, smart contracts, or public or private keys, and secure computer 210 protects the secure electronic system against fraudulent release requests and hacking.

From time to time, it may be necessary for secure computer 210 to power up and make hot one or more of cold memory modules 226b, 226c, and 226d (or cold wallets 226b, 226c, and 226d). Likewise, it may be necessary for secure computer 210 to power down and make cold hot memory module 224a (or hot wallet 224a). Secure computer 210 includes memory powering block 220 configured to power up cold memory modules 226b, 226c, and 226d (or cold wallets 226b, 226c, and 226d), and to power down hot memory module 224a (or hot wallet 224a). Memory powering block 220 can include a power source such as a battery or a voltage regulator (not shown in FIG. 2). Hot memory module 224a (or hot wallet 224a) and cold memory modules 226b, 226c, and 226d (or cold wallets 226b, 226c, and 226d) require a power source in order to add or remove cryptocurrencies, digital currencies, tokens, smart contracts, or public or private keys. Memory powering block 220 controls switches 222 in order to connect memory modules to, or disconnect memory modules from, a power source.

Memory powering block 220 can include control circuitry for determining which of switches 222 to open or close. In one implementation, memory powering block 220 includes hard-wired logic circuitry for determining which of switches 222 to close. In one implementation, memory powering block 220 includes programmable logic for determining which of switches 222 to close. Memory powering block 220 may communicate with and retrieve input from other blocks and elements of secure computer 210 for controlling the powering up and powering down of hot memory module 224a (or hot wallet 224a) and cold memory modules 226b, 226c, and 226d (or cold wallets 226b, 226c, and 226d).

Memory powering block 220 and empty/full checker 218 may communicate to power up cold memory modules 226b, 226c, and 226d (or cold wallets 226b, 226c, and 226d) when empty/full checker 218 detects an empty condition. Empty/full checker 218 can detect an empty condition when cryptocurrencies, digital currencies, tokens, smart contracts, or public or private keys stored in hot memory module 224a (or hot wallet 224a) fall below a low threshold. In one implementation, a low threshold can be a fixed quantity, such as zero. For example, if receive/release block 214 is required to release 700,000 units of cryptocurrencies, but hot memory module 224a (or hot wallet 224a) presently contains only 508,000 units, empty/full checker 218 can detect this condition and flag the anticipated empty condition, and memory powering block 220 can power up and make hot one of cold memory modules 226b, 226c, or 226d (or cold wallets 226b, 226c, or 226d) to provide additional cryptocurrencies for the anticipated deficit due to the upcoming empty condition of hot wallet 224a. In various implementation, a low threshold can be dynamic and depend on a quantity of cryptocurrencies presently requested to be released, an expected quantity of cryptocurrencies needed for satisfying upcoming requests, time, or other algorithms.

Empty/full checker 218 can also detect an empty condition when a memory space consumed by hot memory module 224a (or hot wallet 224a) falls below a low threshold. For example, if empty/full checker 218 determines that cryptocurrencies stored in hot memory module 224a (or hot wallet 224a) consume less than 500 megabytes, empty/full checker 218 can detect an anticipated empty condition, and memory powering block 220 can power up and make hot one of cold memory modules 226b, 226c, or 226d (or cold wallets 226b, 226c, or 226d) to provide for anticipated withdrawals of cryptocurrencies beyond the 500 megabytes threshold presently available in the present hot wallet 224a.

Memory powering block 220 and empty/full checker 218 may also communicate to power up cold memory modules 226b, 226c, and 226d (or cold wallets 226b, 226c, and 226d) when empty/full checker 218 detects a full condition. Empty/full checker 218 can detect a full condition when cryptocurrencies, digital currencies, tokens, smart contracts, or public or private keys stored in hot memory module 224a (or hot wallet 224a) rise above a high threshold. In one implementation, a high threshold can be a fixed quantity, such as 700,000 units of cryptocurrencies. The fixed quantity can correspond to a fund reserve, such as a daily reserve of an online banking service. For example, if receive/release block 214 is required to receive 230,000 units of cryptocurrencies, but hot memory module 224a (or hot wallet 224a) already contains 508,000 units, empty/full checker 218 can detect an anticipated full condition, and memory powering block 220 can power up and make hot one of cold memory modules 226b, 226c, or 226d (or cold wallets 226b, 226c, or 226d) in order to accept the quantity of cryptocurrencies that would exceed the full condition of hot wallet 224a. In one implementation, a high threshold can be dynamic and depend on a quantity of cryptocurrencies presently required to be received, an expected quantity of cryptocurrencies needed for satisfying upcoming requests, time, or other algorithms. For example, receive/release block 214 can include an algorithm for predicting a dynamic daily reserve, and empty/full checker 218 may dynamically set a high threshold accordingly.

Empty/full checker 218 can also detect a full condition when a memory space consumed by hot memory module 224a rises above a high threshold. For example, if empty/full checker 218 determines that cryptocurrencies stored in hot memory module 224a (or hot wallet 224a) already consume 199 gigabytes, and that hot memory module 224a (or hot wallet 224a) has a maximum memory space of 200 gigabytes, empty/full checker 218 can detect a full condition, and memory powering block 220 can power up and make hot one of cold memory modules 226b, 226c, or 226d (or cold wallets 226b, 226c, or 226d).

In order to detect empty conditions and full conditions, empty/full checker 218 continuously tracks quantities of cryptocurrencies, digital currencies, tokens, smart contracts, or public or private keys stored in hot memory module 224a (or hot wallet 224a). For example, empty/full checker 218 can continuously monitor and record a current quantity of cryptocurrencies, digital currencies, tokens, smart contracts, or public or private keys stored in hot memory module 224a (or hot wallet 224a) by performing read operations. Empty/full checker 218 can also communicate with receive/release block 214 to track a requested quantity of deposits or withdrawals. Empty/full checker 218 can use the requested quantity of deposits or withdrawals to determine or anticipate if hot memory module 224a (or hot wallet 224a) will trigger an empty condition or a full condition.

Empty/full checker 218 can also track quantities of cryptocurrencies, digital currencies, tokens, smart contracts, or public or private keys stored in cold memory modules 226b, 226c, and 226d (or cold wallets 226b, 226c, and 226d). For example, empty/full checker 218 can monitor and record quantities of cryptocurrencies, digital currencies, tokens, smart contracts, or public or private keys stored in a memory module by performing a read operation prior to memory powering block 220 powering down the memory module and making it cold. As another example, empty/full checker 218 may read and record quantities of cryptocurrencies stored in cold memory modules 226b, 226c, and 226d (or cold wallets 226b, 226c, and 226d) when an operator initializes secure computer 210, or whenever an operator connects a new memory module.

By tracking quantities of cryptocurrencies stored in both hot memory module 224a (or hot wallet 224a) and cold memory modules 226b, 226c, and 226d (or cold wallets 226b, 226c, and 226d), secure computer 210 can perform transactions in cryptocurrencies based on the total quantity thereof stored in all memory modules. In the present implementation, memory powering block 220 balances all memory modules such that only the memory module with the lowest quantity of cryptocurrencies stored therein is powered up and kept hot. Since receive/release block 214 can only release cryptocurrencies from the hot memory module, memory powering block 220 balancing the memory modules in this manner means that the quantity of cryptocurrencies that could be lost to fraudulent release requests and hacking is kept to a minimum.

Signature verification block 216 ensures that receive/release block 214 only releases cryptocurrencies, digital currencies, tokens, smart contracts, or public or private keys to authorized users. Further, signature verification block 216 ensures that receive/release block 214 only receives cryptocurrencies, digital currencies, tokens, smart contracts, or public or private keys from authorized users. Signature verification block 216 can store cryptographic signatures of authorized users and communicate with receive/release block 214. Signature verification block 216 verifies that requests made to secure computer 210 contain at least one cryptographic signature from an authorized user before receive/release block 214 completes the request. In some implementations, multiple cryptographic signatures can be required for receive/release block 214 to complete the request. If any necessary cryptographic signature is not provided, receive/release block 214 can send a response indicating a denial along with error codes or reasons for the denial.

In one implementation, and as an additional safeguard, secure computer 210 may also utilize signature verification block 216 to verify cryptographic signatures from authorized administrators and officers before memory powering block 220 powers up and makes hot one of cold memory modules 226b, 226c, or 226d (or cold wallets 226b, 226c, or 226d). For example, if empty/full checker 218 detects an empty condition or a full condition, signature verification block 216 may require cryptographic signatures from a majority of a group of administrators or officers (such as three out of five administrators or officers) before powering up and making hot one of cold memory modules 226b, 226c, or 226d (or cold wallets 226b, 226c, or 226d). Empty conditions and full conditions can be optimized such that powering up and making hot one of cold memory modules 226b, 226c, or 226d (or cold wallets 226b, 226c, or 226d) will be required less frequently. By requiring verification from a number of administrators or officers before powering up and making hot one of cold memory modules 226b, 226c, or 226d (or cold wallets 226b, 226c, and 226d), large or anomalous transactions, and insider transactions and authorizations can be properly monitored, double checked and verified before receive/release block 214 can access and release additional cryptocurrencies.

Signature verification block 216 can also recognize a distress key when verifying cryptographic signatures of administrators or officers. The distress key indicates that one of the administrators or officers is acting under duress. The distress key can be a portion of an administrator or officer cryptographic signature or an alternative administrator or officer cryptographic signature. In response to recognizing a distress key, signature verification block 216 can deny a request for receiving or releasing cryptocurrencies or prevent powering up and making hot one of cold memory modules 226b, 226c, or 226d (or cold wallets 226b, 226c, or 226d), or alert emergency personnel.

As illustrated in FIG. 2, secure computer 210 also includes rate limiter 212. Rate limiter 212 detects a present release rate of cryptocurrencies released from hot memory module 224a (or hot wallet 224a). If one of cold memory modules 226b, 226c, or 226d (or cold wallets 226b, 226c, or 226d) is powered up and made hot, rate limiter 212 will also account for cryptocurrencies released from that memory module when detecting a present release rate.

Rate limiter 212 compares the detected present release rate against, and limits the present release rate to, a preset maximum release rate. For example, rater limiter 212 may establish a hard limit on a daily quantity of cryptocurrencies permitted to be released from hot memory modules. In one implementation, the preset maximum release rate may be a gross outgoing release rate, and rate limiter 212 may be designed to only detect the quantity of cryptocurrencies released from hot memory modules. In another implementation, the preset maximum release rate may be a net outgoing release rate, and rate limiter 212 may be designed to detect the difference between the quantity of cryptocurrencies released from hot memory modules and the quantity of cryptocurrencies received by hot memory modules. In one implementation, the preset maximum release rate may represent a hard limit on a quantity of release requests per unit time, rather than a quantity of cryptocurrencies released per unit time.

In one implementation, rate limiter 212 includes a hardware counter. When implemented with a hardware counter, rate limiter 212 provides additional security against electronic theft as compared with a software rate limiter. In the unlikely event that secure computer 210 is hacked, the preset maximum release rate of the hardware counter cannot be altered by software, and will continue to restrict the release of cryptocurrencies, digital currencies, tokens, smart contracts, or public or private keys from hot memory modules.

Whether implemented as hardware counter or as a software rate limiter, rate limiter 212 can be designed such that the preset maximum release rate cannot be modified without physical access to secure computer 210. For example, a software rate limiter may have policy restrictions such that a physical user interface (not shown in FIG. 2) on secure computer 210 provides the only valid input to modify the preset maximum release rate. For ease of description, rate limiter 212 is shown an element of secure computer 210, but it is understood that rate limiter 212 can be separate from and hardwired to secure computer 210.

In one implementation, rate limiter 212 can restrict release of cryptocurrencies, digital currencies, tokens, smart contracts, or public or private keys from hot memory module 224a (or hot wallet 224a) prior to any other security action by secure computer 210. For example, before empty/full checker 218 checks an empty condition or a full condition, or even before signature verification block 216 verifies a user cryptographic signature, rate limiter 212 can detect that a requested release would cause the present release rate to exceed the preset maximum release rate. Rate limiter 212 can then restrict the release without further processing by secure computer 210, and receive/release block 214 can send a response indicating a denial. By utilizing rate limiter 212, secure computer 210 ensures that a hacker cannot access or drain large quantities of cryptocurrencies from secure computer 210.

Figure 3:
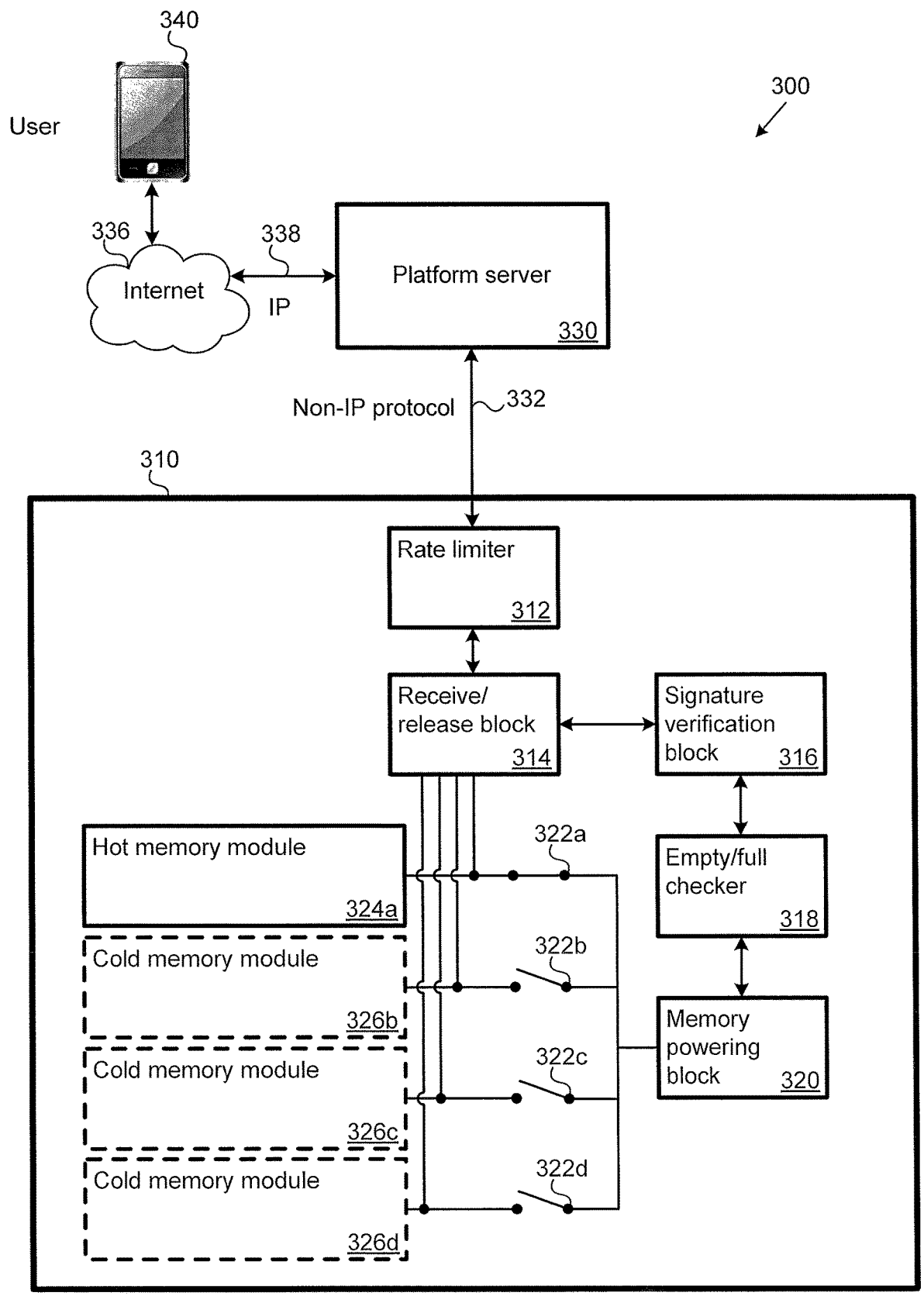
FIG. 3 illustrates a diagram of a portion of an exemplary secure electronic system according to one implementation of the present application.

FIG. 3 illustrates a diagram of a portion of an exemplary secure electronic system according to one implementation of the present application. As illustrated in FIG. 3, secure electronic system 300 includes secure computer 310, platform server 330, secure connection 332, Internet 336, connection 338, and user 340. Secure electronic system 300 in FIG. 3 generally corresponds to secure electronic system 100 shown in FIG. 1, and may have any of the implementations and advantages discussed above. Secure computer 310 includes rate limiter 312, receive/release block 314, signature verification block 316, empty/full checker 318, memory powering block 320, switches 322a, 322b, 322c, and 322d, collectively referred to as switches 322, hot memory module 324a, and cold memory module 326b, 326c, and 326d. Secure computer 310 in FIG. 3 generally corresponds to secure computer 210 shown in FIG. 2, and may have any of the implementations and advantages discussed above.

Conventional electronic systems providing an online banking service, an OTC electronic market service, an electronic exchange service, or a repository service may implement all of the service features (e.g. web interface, primary service software, related databases, authorization, and receive/release) on a single server. To support certain service features, conventional systems run software that is not written by the system administrator or operator. This software can include a stack, kernel, group communication protocol over Internet protocol (GCPIP) implementations, etc. Software not written by the system administrator or operator can have a bug, exploit, or other hidden vulnerability that can expose the conventional systems to hacking. Moreover, conventional systems are connected to numerous unknown parties over the Internet, which is a common source of hacks.

According to the present disclosure, as shown in FIG. 3, secure electronic system 300 includes platform server 330 and separate secure computer 310. Secure computer 310 runs only software written by the system administrator or operator. Some server-side features, such as websites, scripts, and databases, running on the platform server 330 can still contain software not written by the system administrator or operator. Meanwhile, more sensitive features, such as receiving and releasing cryptocurrencies, digital currencies, tokens, smart contracts, or public or private keys, run on secure computer 310. Thus, a system administrator or operator does not have to write all of the software used to provide service features, but secure electronic system 300 still ensures that the more sensitive features cannot be exposed to hacking due to software vulnerabilities.

Platform server 330 has a direct connection to Internet 336 over connection 338, which is an IP communication link, in order to provide service features to user 340 and to perform other communications. However, secure computer 310 does not have a direct connection to Internet 336. Secure computer 310 only connects to platform server 330, and only connects through secure connection 332, which is a non-IP protocol communication link. The non-IP protocol used by secure connection 332 is a protocol known only to an administrator or operator of secure electronic system 300. In one implementation, the non-IP protocol also avoids including SSH or other common network communication protocols. In one implementation, the non-IP protocol used by secure connection 332 can be a custom network communication protocol developed by an administrator or operator and based on a less common network communication protocol, such as Internetwork Packet Exchange (IPX) or Recursive InterNetwork Architecture (RINA). In one implementation, the non-IP protocol used by secure connection 332 can be an entirely custom network communication protocol developed by the administrator or operator. The non-IP protocol used by secure connection 332 is specifically designed to only handle communications for receiving and releasing cryptocurrencies, digital currencies, tokens, smart contracts, or public or private keys. Secure connection 332 can include a firewall (not shown in FIG. 3), such as firewall 134 in FIG. 1, that restricts network communications between secure computer 310 and platform server 330 to only communications necessary for the more sensitive features running on secure computer 310. For example, the firewall can restrict network communications to receiving and releasing cryptocurrencies, digital currencies, tokens, smart contracts, or public or private keys.

Secure electronic system 300 provides multiple safeguards against hacking. First, because platform server 330 only connects to secure computer 310 over secure connection 332 using a non-IP protocol, even if platform server 330 is hacked from Internet 336, the hacker will be unable to use the same communication protocol (i.e. IP) to access the more sensitive features of secure electronic system 300. The additional time necessary to reverse engineer a custom protocol may alone be a significant deterrent for a hacker.

Second, because secure connection 332 using a non-IP protocol is specifically designed to only handle communications for receiving and releasing cryptocurrencies, digital currencies, tokens, smart contracts, or public or private keys, even if a hacker reverse engineers the non-IP protocol, he/she will be unable to perform any other actions over secure connection 332 besides making requests for receipt or release of cryptocurrencies, digital currencies, tokens, smart contracts, or public or private keys. He will be unable to snoop or to request additional access.

Third, because signature verification block 316 verifies a user cryptographic signature, even if a hacker requests release of cryptocurrencies, digital currencies, tokens, smart contracts, or public or private keys, they will not be released unless the hacker also acquires a user cryptographic signature. Fourth, because memory powering block 320 and empty/full checker 318 are required to power up one of cold memory modules 326b, 326c, or 326d (or cold wallets 326b, 326c, or 326d), even if a hacker acquires a user cryptographic signature and generates a fraudulent release request, he cannot release a large quantity of cryptocurrencies, digital currencies, tokens, smart contracts, or public or private keys without secure electronic system 300 detecting that one of cold memory modules 326b, 326c, or 326d (or cold wallets 326b, 326c, or 326d) has been powered up and made hot. Fifth, because rate limiter 312 restricts release of cryptocurrencies, digital currencies, tokens, smart contracts, or public or private keys from hot memory modules to a preset maximum release rate, even if additional memory modules are powered up and made hot, a hacker cannot release the entirety of the cryptocurrencies stored therein.

Figure 4:
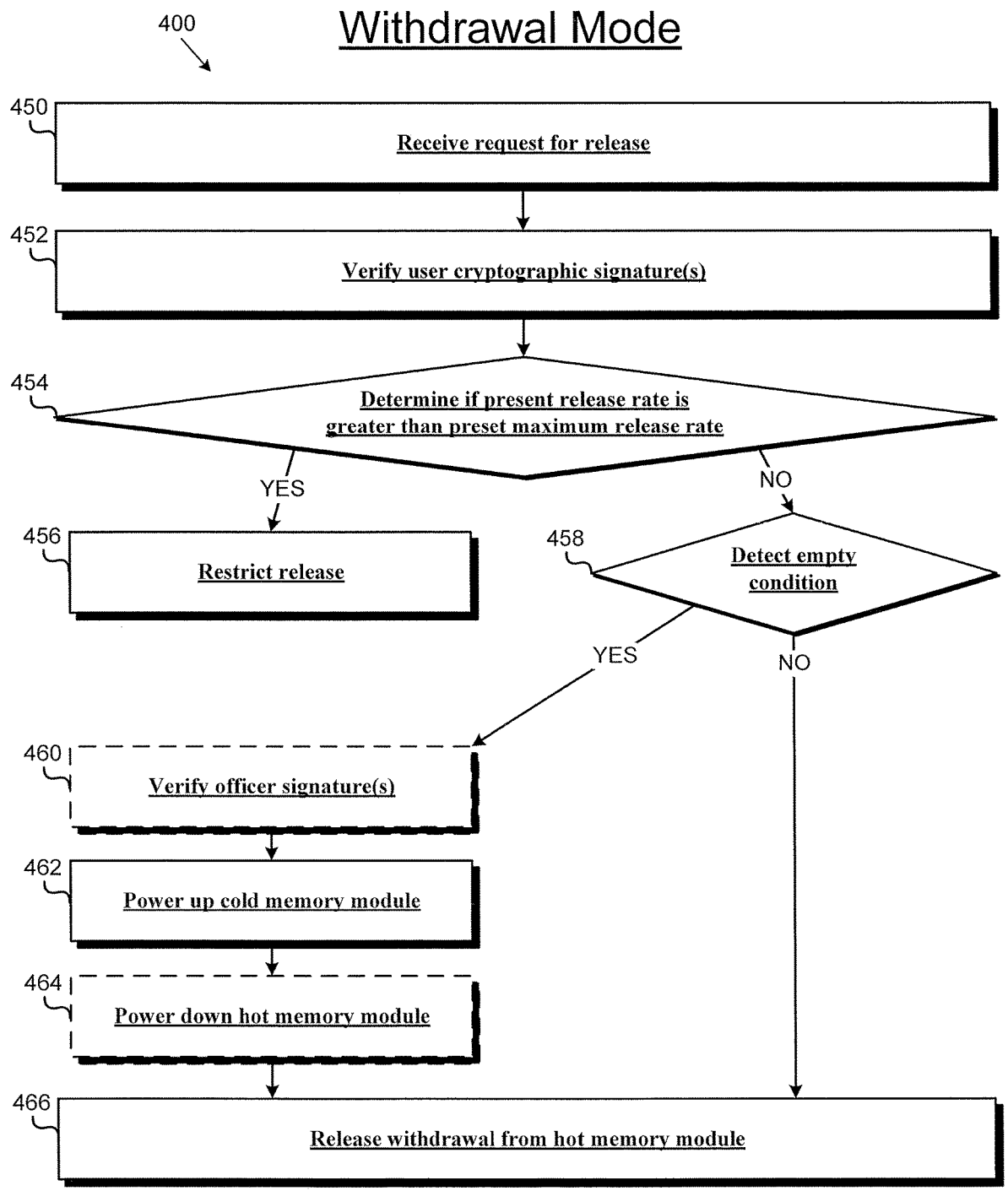
FIG. 4 illustrates a flowchart of an exemplary method according to one implementation of the present application.

Flowchart 400 in FIG. 4 represents an exemplary method for using a secure computer, such as secure computer 310 in FIG. 3, in a withdrawal mode. In the withdrawal mode, secure computer 310 can allow or deny release of cryptocurrencies in a highly secure manner. The approach and technique indicated by flowchart 400 are sufficient to describe at least one implementation of the present disclosure, however, other implementations of the disclosure may utilize approaches and techniques different from those shown in flowchart 400. In one implementation, the method illustrated in FIG. 4 may include additional steps. In one implementation, method steps may be performed in an order other than the order shown. Furthermore, while flowchart 400 is described with respect to secure electronic system 300 in FIG. 3, the disclosed inventive concepts are not intended to be limited by specific features shown and described with respect to FIG. 3.

At step 450, secure computer 310 receives a request for release of cryptocurrencies, digital currencies, tokens, smart contracts, or public or private keys. For example, secure computer 310 can receive a request from platform server 330 over secure connection 332 using a non-IP protocol. Receive/release block 314 can then process the request. The request can include, for example, information about a quantity of cryptocurrencies requested to be released, a cryptographic signature, and any other information useful for receive/release block 314 to process the request.

At step 452, secure computer 310 verifies a user cryptographic signature. For example, signature verification block 316 can verify that a release request made to secure computer 310 contains at least one cryptographic signature from a withdrawing authorized user before receive/release block 314 completes the request. In some implementations, multiple cryptographic signatures can be required for receive/release block 314 to complete the request. If any necessary cryptographic signature is not provided, receive/release block 314 can send a response indicating a denial along with error codes or reasons for the denial.

At step 454, secure computer 310 determines if a detected present release rate is greater than a preset maximum release rate. For example, rater limiter. 312 can detect a daily quantity of cryptocurrencies that have been released from hot memory modules, and determine if that quantity is greater than a daily quantity permitted to be released from hot memory modules. In one implementation, the preset maximum release rate can be user-specific. For example, rate limiter 312 can have a different preset maximum release rate for each set of user cryptographic signatures in signature verification block 316. In one implementation, the present release rate can include the quantity of cryptocurrencies requested in the release request currently being processed by receive/release block 314, in addition to the quantity of cryptocurrencies that have already been released. For example, if rate limiter 312 detects that 600,000 units of cryptocurrencies have been released from hot memory module 324a (or hot wallet 324a) today, and that the current release request requires 200,000 units of cryptocurrencies, rate limiter 312 can detect that the present release rate is 800,000 units of cryptocurrencies for today. If the preset maximum release rate is 700,000 units of cryptocurrencies per day, rate limiter 312 can determine that the detected present release rate is greater than the preset maximum release rate, and proceed to step 456.

At step 456, rate limiter 312 can restrict the release of cryptocurrencies, digital currencies, tokens, smart contracts, or public or private keys from hot memory module 324a (or hot wallet 324a). In one implementation, rate limiter 312 can be a hardware device, such as a hardware counter. In one implementation, an output signal from the hardware counter is used with hardware logic to prevent receive/release block 314 from releasing cryptocurrencies, digital currencies, tokens, smart contracts, or public or private keys. In one implementation, based on an output signal from the hardware counter, memory powering block 320 powers down hot memory module 324a (or hot wallet 324a). In one implementation, rate limiter 312 can be implemented using software, and can execute code instructing receive/release block 314 not to release cryptocurrencies, digital currencies, tokens, smart contracts, or public or private keys. In one implementation, rate limiter 312 can restrict the entire quantity of cryptocurrencies, digital currencies, tokens, smart contracts, or public or private keys of the release request currently being processed by receive/release block 314. In one implementation, rate limiter 312 can restrict a partial quantity of cryptocurrencies, digital currencies, tokens, smart contracts, or public or private keys of the release request currently being processed by receive/release block 314. For example, if rate limiter 312 detects that 600,000 units of cryptocurrencies have been released from hot memory module 324a (or hot wallet 324a) today, that the current release request requests 200,000 units of cryptocurrencies, and that the preset maximum release rate is 700,000 units of cryptocurrencies per day, then rate limiter 312 can restrict release of 100,000 units of the 200,000 units requested, while permitting release of the other 100,000 units requested. If rate limiter 312 restricts a requested release, receive/release block 314 can send a response indicating a denial along with error codes or reasons for the denial.

If rate limiter 312 determines that the detected present release rate is not greater than the preset maximum release rate, secure computer 310 can proceed to step 458. At step 458, secure computer 310 checks for an empty condition. For example, empty/full checker 318 can detect an empty condition when a quantity of cryptocurrencies stored in hot memory module 324a (or hot wallet 324a) falls below a low threshold. In one implementation, a low threshold can be a fixed quantity, such as zero. In various implementations, a low threshold can be dynamic and depend on a quantity of cryptocurrencies presently requested to be released, an anticipated quantity of cryptocurrencies needed for satisfying upcoming requests, time, or other algorithms. If empty/full checker 318 does not detect an empty condition, secure computer 310 can proceed to step 466. If empty/full checker 318 detects an empty condition, secure computer 310 can optionally proceed to step 460, or can skip step 460 and proceed to step 462.

At step 460, secure computer 310 optionally verifies an administrator or officer cryptographic signature. For example, if empty/full checker 318 detects an empty condition, signature verification block 316 can require cryptographic signatures from three out of five administrators or officers before memory powering block 320 powers up and makes hot one of cold memory modules 326b, 326c, or 326d (or cold wallets 326b, 326c, or 326d). Thus, administrators or officers can intervene if it appears that a hacker is draining cryptocurrencies from hot memory modules.

At step 462, secure computer 310 powers up and makes hot one of cold memory modules 326b, 326c, or 326d (or cold wallets 326b, 326c, or 326d). For example, memory powering block 320 controls switches 322b, 322c, and 322d in order to connect one of cold memory modules 326b, 326c, or 326d (or cold wallets 326b, 326c, or 326d) to a power source. In one implementation, memory powering block 320 includes hard-wired logic circuitry for determining which of switches 322b, 322c, and 322d to close. In one implementation, memory powering block 320 uses programmable logic for determining which of switches 322b, 322c, and 322d to close.

Memory powering block 320 can control the powering up of one of cold memory modules 326b, 326c, or 326d (or cold wallets 326b, 326c, or 326d) based on input retrieved from other blocks or elements of secure computer 310. By powering up and making hot one of cold memory modules 326b, 326c, or 326d (or cold wallets 326b, 326c, or 326d) in response to empty/full checker 318 detecting an empty condition, secure computer 310 keeps cryptocurrencies, digital currencies, tokens, smart contracts, or public or private keys stored in cold memory modules 326b, 326c, or 326d (or cold wallets 326b, 326c, or 326d) immune to hacking or unauthorized access before providing additional cryptocurrencies, digital currencies, tokens, smart contracts, or public or private keys as needed.

At step 464, after powering up and making hot one of cold memory modules 326b, 326c, or 326d (or cold wallets 326b, 326c, or 326d), secure computer 310 can optionally power down and make cold hot memory module 324a (or hot wallet 324a) so as to minimize the quantity of cryptocurrencies, digital currencies, tokens, smart contracts, or public or private keys that could be lost to hacking or unauthorized access.

At step 466, secure computer 310 can release cryptocurrencies, digital currencies, tokens, smart contracts, or public or private keys from a hot memory module, such as hot memory module 324a (or hot wallet 324a), to a withdrawing authorized user. Receive/release block 314 can also send a response message confirming withdrawal. FIGS. 5A, 5B, 5C, and 5D each illustrate a diagram of a portion of an exemplary secure electronic system according to one implementation of the present application. As illustrated in FIGS. 5A, 5B, 5C, and 5D, secure electronic system 500 includes secure computer 510, platform server 530, secure connection 532, Internet 536, connection 538, and withdrawing user 540. Secure electronic system 500 in FIGS. 5A, 5B, 5C, and 5D generally corresponds to secure electronic system 300 shown in FIG. 3, and may have any of the implementations and advantages discussed above. Secure computer 510 includes rate limiter 512, receive/release block 514, signature verification block 516, empty/full checker 518, memory powering block 520, and switches 522a, 522b, 522c, and 522d, collectively referred to as switches 522. Secure computer 510 in FIG. 5 generally corresponds to secure computer 310 shown in FIG. 3, and may have any of the implementations and advantages discussed above.

Figure 5A:
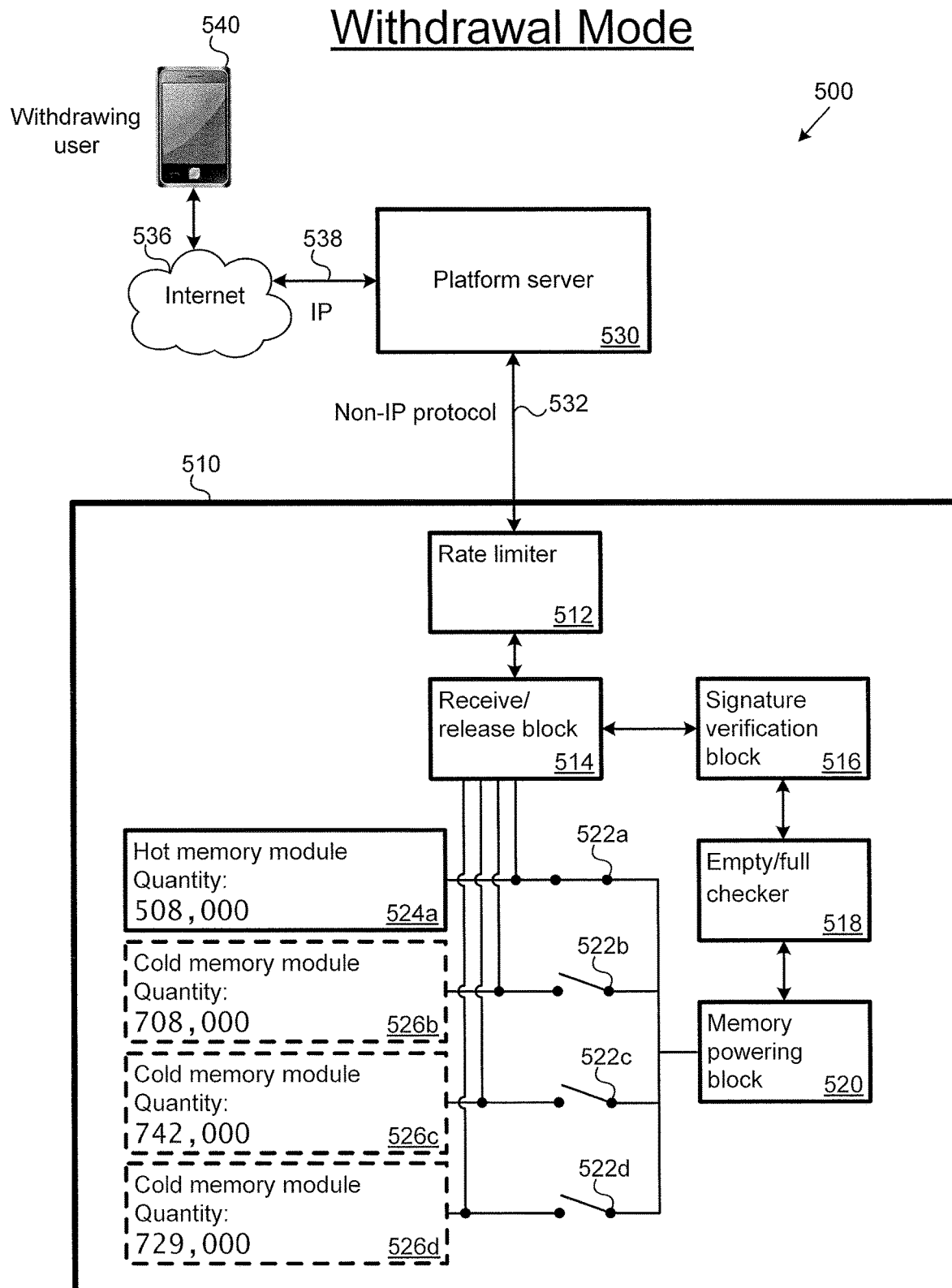
FIGS. 5A, 5B, 5C, and 5D each illustrate a diagram of a portion of an exemplary secure electronic system according to one implementation of the present application.

As illustrated in FIG. 5A, secure computer 510 includes hot memory module 524a (or hot wallet 524a), and cold memory modules 526b, 526c, and 526d (or cold wallets 526b, 526c, and 526d). By way of a specific illustrative example, and without in any way limiting the present inventive concepts, hot memory module 524a (or hot wallet 524a) stores a quantity of 508,000 units of cryptocurrencies. Cold memory modules 526b, 526c, and 526d (or cold wallets 526b, 526c, and 526d) store quantities of 708,000 units, 742,000 units, and 729,000 units of cryptocurrencies respectively. As shown in FIG. 5A, memory powering block 520 keeps switch 522a closed, such that hot memory module 524a (or hot wallet 524a) is powered up and cryptocurrencies can be added to or removed from hot memory module 524a (or hot wallet 524a). Meanwhile, memory powering block 520 keeps switches 522b, 522c, and 522d open, such that cold memory modules 526b, 526c, and 526d (or cold wallets 526b, 526c, and 526d) are powered down and cryptocurrencies cannot be added to or removed from cold memory modules 526b, 526c, and 526d (or cold wallets 526b, 526c, and 526d). In the implementation of FIG. 5A, the 508,000 units of cryptocurrencies stored in hot memory module 524a (or hot wallet 524a) is above a low threshold. If receive/release block 514 approves a request from withdrawing user 540 for release of cryptocurrencies, the cryptocurrencies will be released from hot memory module 524a (or hot wallet 524a).

Figure 5B:
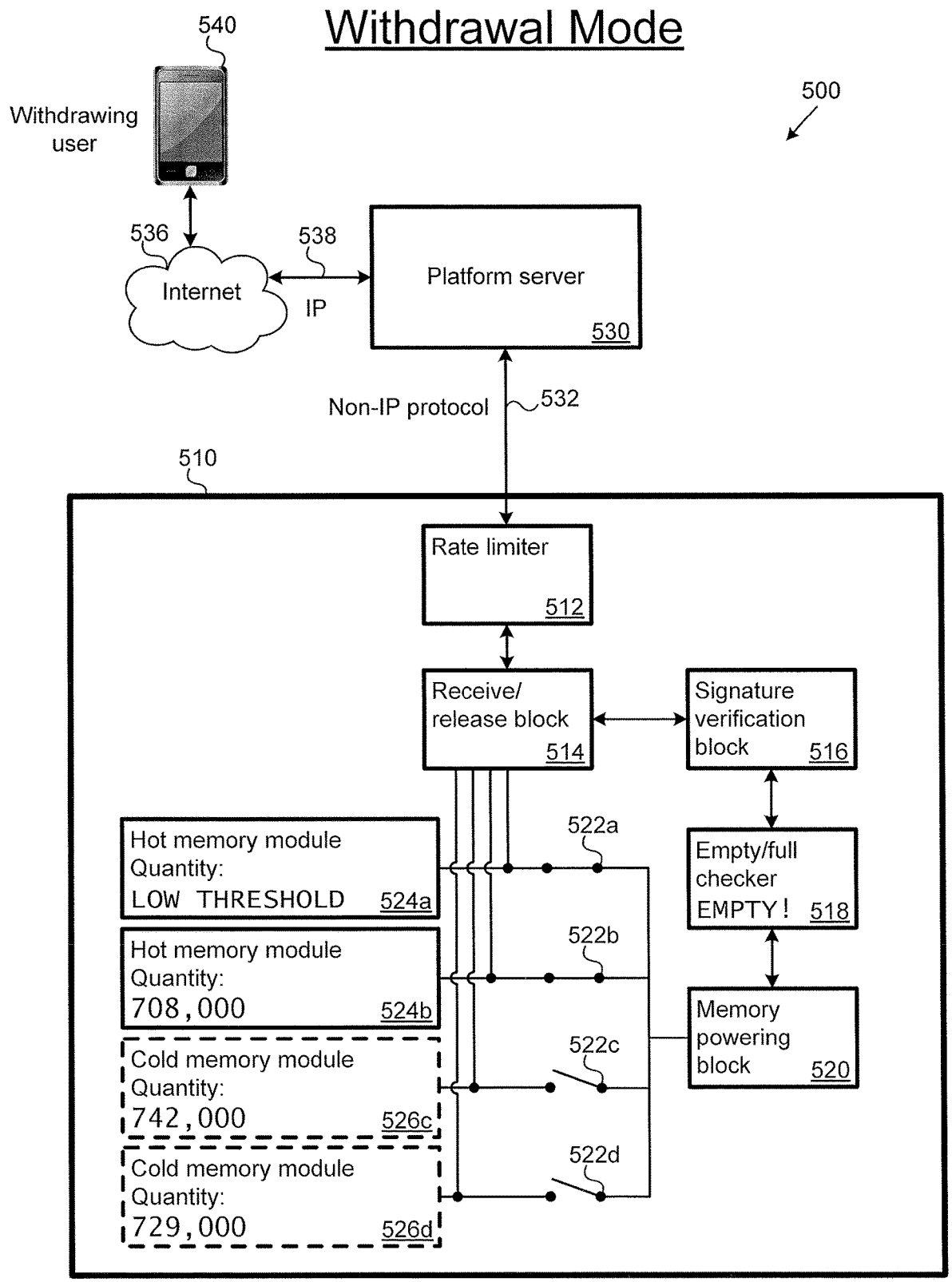

As illustrated in FIG. 5B, secure computer 510 includes hot memory modules 524a and 524b (or hot wallets 524a and 524b), and cold memory modules 526c and 526d (or cold wallets 526c and 526d). By way of continuing the specific illustrative example set forth above, and without in any way limiting the present inventive concepts, FIG. 5B may correspond to FIG. 5A after withdrawing user 540 withdraws a quantity of approximately 508,000 units of cryptocurrencies from hot memory module 524a (or hot wallet 524a). As shown in FIG. 5B, the quantity of cryptocurrencies stored in hot memory module 524a (or hot wallet 524*a*) is now below a low threshold. Empty/full checker 518 reports "EMPTY!" to indicate that it detected an anticipated empty condition (as a warning, and not as a literally empty indication) from hot memory module 524*a* (or hot wallet 524*a*). Memory powering block 520 has closed switch 522*b*, such that hot memory module 524*b* (or hot wallet 524*b*) is powered up and cryptocurrencies can be added to or removed from hot memory module 524*b* (or hot wallet 524*b*). Cold memory module 526*b* (or cold wallet 526*b*) in FIG. 5A is now depicted as hot memory module 524*b* (or hot wallet 524*b*) in FIG. 5B. In FIG. 5B, if receive/release block 514 approves a request from withdrawing user 540 for release of cryptocurrencies, the cryptocurrencies will be released from hot memory module 524*b*.

Figure 5C:
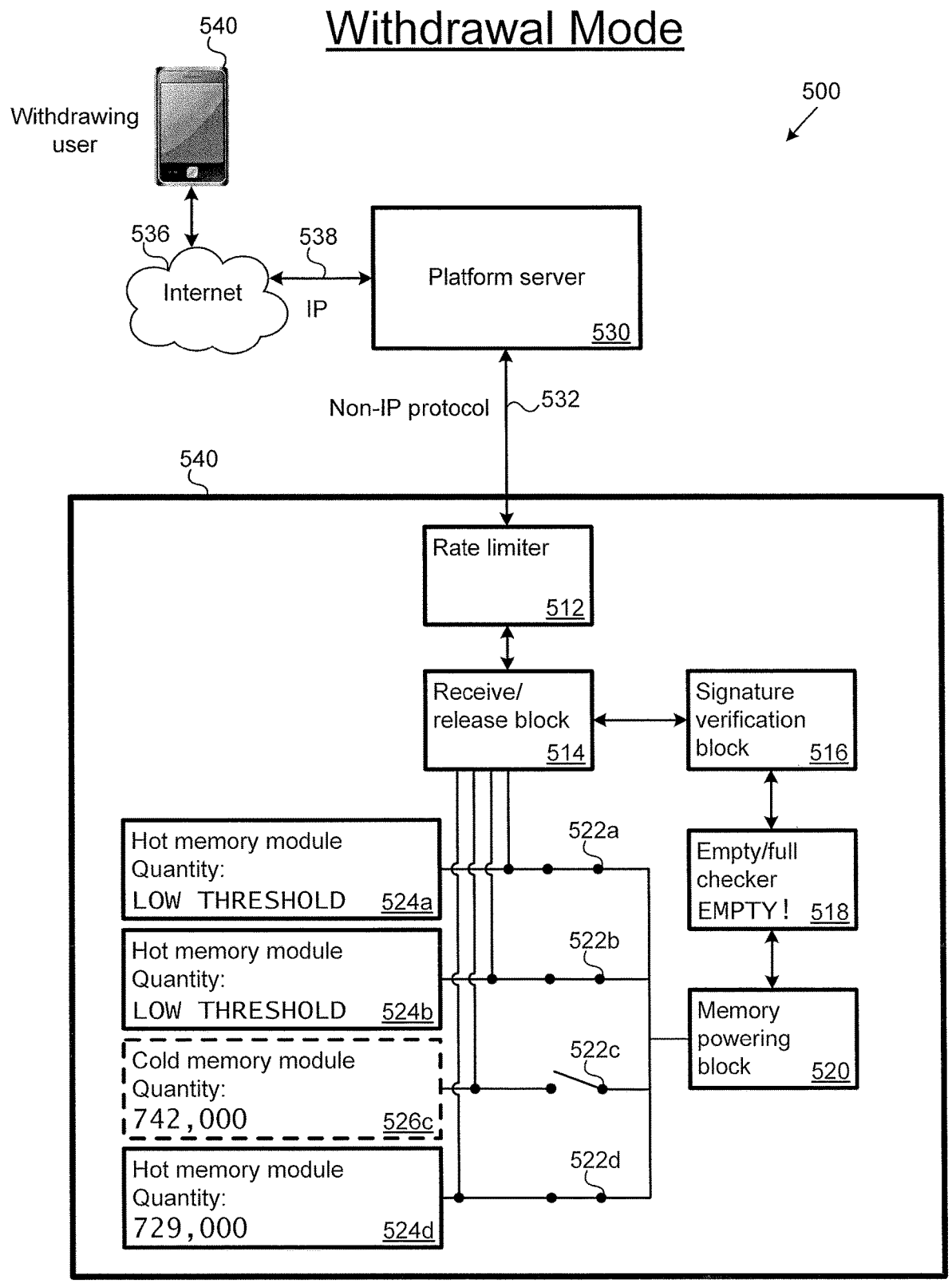

As illustrated in FIG. 5C, secure computer 510 includes hot memory modules 524*a*, 524*b*, and 524*d* (or hot wallets 524*a*, 524*b*, and 524*d*), and cold memory module 526*c* (or cold memory module 526*c*). By way of continuing the specific illustrative example set forth above, and without in any way limiting the present inventive concepts, FIG. 5C may correspond to FIG. 5B after withdrawing user 540 withdraws a quantity of approximately 708,000 units of cryptocurrencies from hot memory module 524*b* (or hot wallet 524*b*). As shown in FIG. 5C, the quantity of cryptocurrencies stored in hot memory module 524*b* (or hot wallet 524*b*) is now below a low threshold. Empty/full checker 518 reports "EMPTY!" to indicate that it detected an anticipated empty condition (as a warning, and not as a literally empty indication) from hot memory module 524*b* (or hot wallet 524*b*). Memory powering block 520 has closed switch 522*d*, such that hot memory module 524*d* (or hot wallet 524*d*) is powered up and cryptocurrencies can be added to or removed from hot memory module 524*d* (or hot wallet 524*d*). Cold memory module 526*d* (or cold wallet 526*d*) in FIG. 5B is now depicted as hot memory module 524*d* (or hot wallet 524*d*) in FIG. 5C. If receive/release block 514 approves a request from withdrawing user 540 for release of cryptocurrencies, the cryptocurrencies will be released from hot memory module 524*d* (or hot wallet 524*d*). Notably, in FIG. 5C, memory powering block 520 has not closed switch 522*c*, leaving cold memory module 526*c* (or cold wallet 526*c*) powered down. This is because the quantity of cryptocurrencies stored in hot memory module 524*d* (or hot wallet 524*d*) is less than that of cold memory module 526*c* (or cold wallet 526*c*), i.e. the 729,000 units of cryptocurrencies stored in hot memory module 524*d* (or hot wallet 524*d*) is less than the 742,000 units of cryptocurrencies stored in cold memory module 526*c* (or cold wallet 526*c*). Thus, the quantity of cryptocurrencies that can be accessed by secure computer 510 is the lowest among all memory modules, and secure electronic system 500 is more secure against hacking or unauthorized access.

Figure 5D:
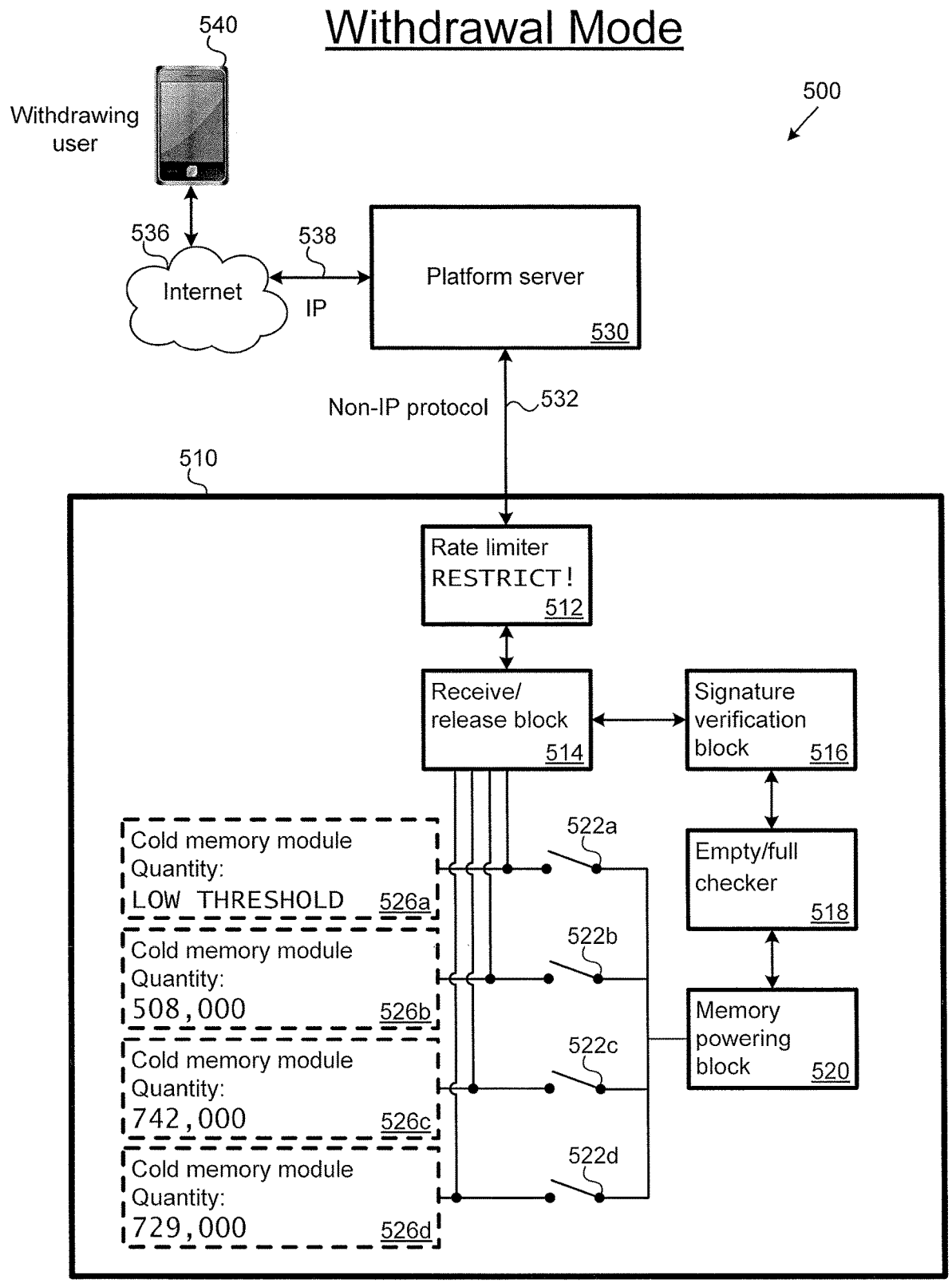

As illustrated in FIG. 5D, secure computer 510 includes cold memory modules 526*a*, 526*b*, 526*c*, and 526*d* (or cold wallets 526*a*, 526*b*, 526*c*, and 526*d*). By way of continuing the specific illustrative example set forth above, and without in any way limiting the present inventive concepts, FIG. 5D may correspond to FIG. 5B after withdrawing user 540 withdraws a total quantity of approximately 700,000 units from hot memory modules 524*a* and 524*b* (or hot wallets 524*a* and 524*b*). In the implementation of FIG. 5D, rate limiter 512 has a maximum preset release rate of 700,000 units of cryptocurrencies permitted to be released per day. Rate limiter 512 reports "RESTRICT!" to indicate that it is restricting release of cryptocurrencies from hot memory modules 524*a* and 524*b* (or hot wallets 524*a* and 524*b*) in FIG. 5B. As shown in FIG. 5D, memory powering block 520 has opened switches 522, such that cold memory modules 526*a*, 526*b*, 526*c*, and 526*d* (or cold wallets 526*a*, 526*b*, 526*c*, and 526*d*) are powered down and cryptocurrencies cannot be added to or removed from cold memory modules 526*a*, 526*b*, 526*c*, and 526*d* (or cold wallets 526*a*, 526*b*, 526*c*, and 526*d*). Hot memory modules 524*a* and 524*b* (or hot wallets 524*a* and 524*b*) in FIG. 5B are now depicted as cold memory modules 526*a* and 526*b* (or cold wallets 526*a* and 526*b*) in FIG. 5D. In FIG. 5D, a request from withdrawing user 540 for release of cryptocurrencies will be denied, and the cryptocurrencies will not be released from cold memory modules 526*a*, 526*b*, 526*c*, and 526*d* (or cold wallets 526*a*, 526*b*, 526*c*, and 526*d*). In other implementations, as discussed above, rate limiter 512 can restrict release without powering down hot memory modules, such as hot memory modules 524*a* and 524*b* (or hot wallets 524*a* and 524*b*) in FIG. 5B.

Figure 6:
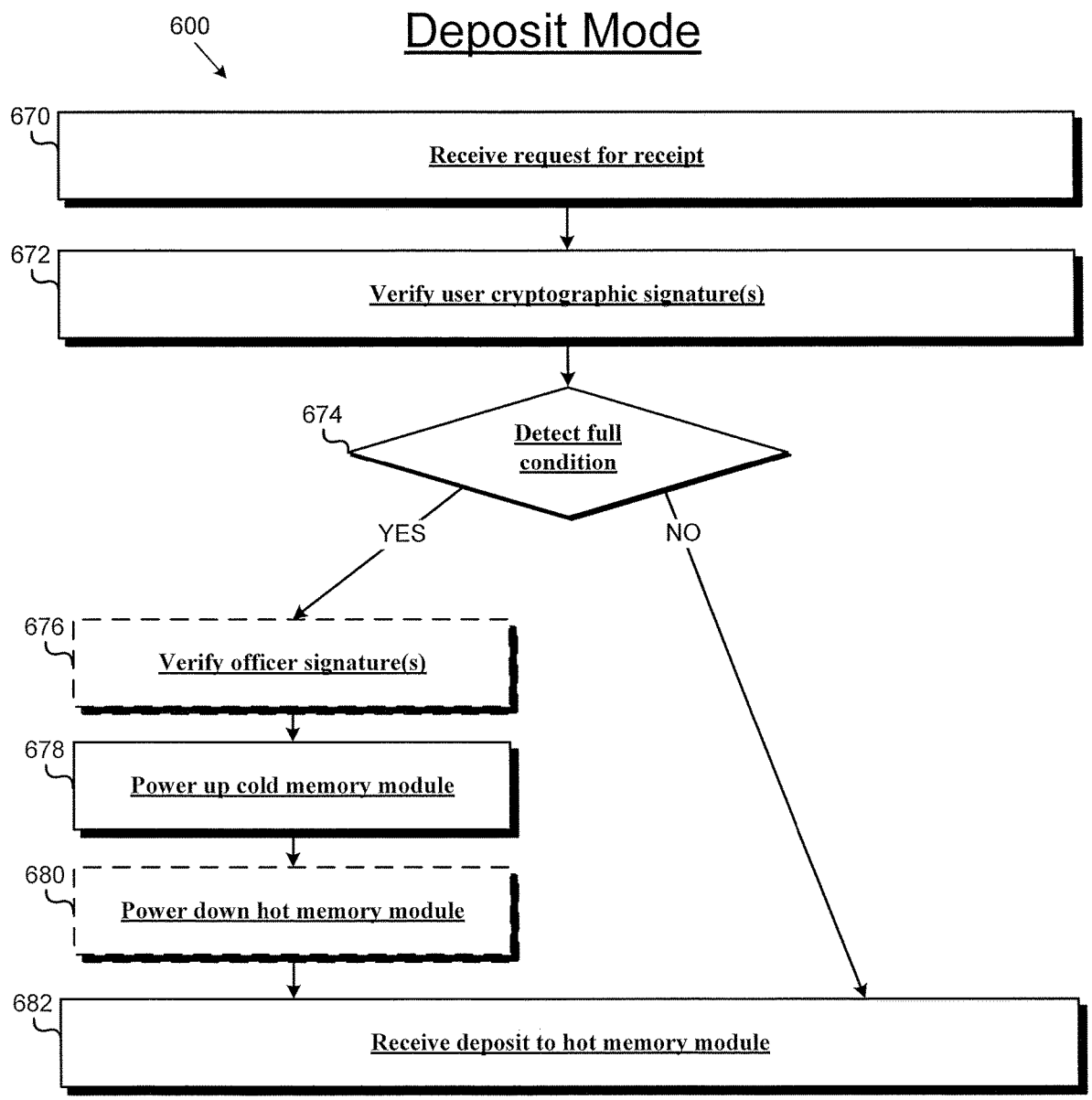
FIG. 6 illustrates a flowchart of an exemplary method according to one implementation of the present application.

FIG. 6 illustrates a flowchart of an exemplary method according to one implementation of the present application. Flowchart 600 represents an exemplary method for using a secure computer, such as secure computer 310 in FIG. 3, in a deposit mode. In the deposit mode, secure computer 310 can allow or deny receipt of cryptocurrencies, digital currencies, tokens, smart contracts, or public or private keys in a highly secure manner. The approach and technique indicated by flowchart 600 are sufficient to describe at least one implementation of the present disclosure, however, other implementations of the disclosure may utilize approaches and techniques different from those shown in flowchart 600. In one implementation, the method illustrated in FIG. 6 may include additional steps, such as rate limiting. In one implementation, method steps may be performed in an order other than the order shown. Furthermore, while flowchart 600 is described with respect to secure electronic system 300 in FIG. 3, the disclosed inventive concepts are not intended to be limited by specific features shown and described with respect to FIG. 3.

At step 670, secure computer 310 receives a request for receipt of cryptocurrencies, digital currencies, tokens, smart contracts, or public or private keys. For example, secure computer 310 can receive a request from platform server 330 over connection 332 using a non-IP protocol. Receive/release block 314 can then process the request. The request can include, for example, information about a quantity of cryptocurrencies to be received, a cryptographic signature, and any other information useful for receive/release block 314 to process the request.

At step 672, secure computer 310 verifies a user cryptographic signature. For example, signature verification block 316 can verify that a receipt request made to secure computer 310 contains at least one cryptographic signature from a depositing authorized user before receive/release block 314 completes the request. In some implementations, multiple cryptographic signatures can be required for receive/release block 314 to complete the request. If any necessary cryptographic signature is not provided, receive/release block 314 can send a response indicating a denial along with error codes or reasons for the denial.

At step 674, secure computer 310 checks for a full condition. For example, empty/full checker 318 can detect a full condition when a quantity of cryptocurrencies stored in hot memory module 324*a* (or hot wallet 324*a*) rises above a high threshold. In one implementation, a high threshold can be a fixed quantity, such as a daily reserve of an online banking service, or a maximum memory space of hot memory module 324*a* (or hot wallet 324*a*). In various implementations, a high threshold can be dynamic and depend on a quantity of cryptocurrencies presently requested to be received, an expected quantity of cryptocurrencies needed for satisfying upcoming requests, time, or other algorithms. If empty/full checker 318 does not detect a full condition, secure computer 310 can proceed to step 682. If empty/full checker 318 detects a full condition, secure computer 310 can optionally proceed to step 676, or can skip step 676 and proceed to step 678.

At step 676, secure computer 310 optionally verifies an administrator or officer cryptographic signature. For example, if empty/full checker 318 detects a full condition, signature verification block 316 can require cryptographic signatures from three out of five administrators or officers before memory powering block 320 powers up and makes hot one of cold memory modules 326b, 326c, or 326d (or cold wallets 326b, 326c, or 326d).

At step 678, secure computer 310 powers up and makes hot one of cold memory modules 326b, 326c, or 326d (or cold wallets 326b, 326c, or 326d). For example, memory powering block 320 controls switches 322b, 322c, and 322d in order to connect one of cold memory modules 326b, 326c, or 326d (or cold wallets 326b, 326c, or 326d) to a power source. In one implementation, memory powering block 320 includes hard-wired logic circuitry for determining which of switches 322b, 322c, and 322d to close. In one implementation, memory powering block 320 uses programmable logic for determining which of switches 322b, 322c, and 322d to close. Memory powering block 320 can control the powering up of one of cold memory modules 326b, 326c, or 326d (or cold wallets 326b, 326c, or 326d) based on input retrieved from other blocks or elements of secure computer 310. By powering up and making hot one of cold memory modules 326b, 326c, or 326d (or cold wallets 326b, 326c, or 326d) in response to empty/full checker 318 detecting a full condition, secure computer 310 keeps cryptocurrencies, digital currencies, tokens, smart contracts, or public or private keys stored in cold memory modules 326b, 326c, or 326d (or cold wallets 326b, 326c, or 326d) immune to hacking or unauthorized access.

At step 680, after powering up and making hot one of cold memory modules 326b, 326c, or 326d (or cold wallets 326b, 326c, or 326d), secure computer 310 can optionally power down and make cold hot memory module 324a (or hot wallet 324a) so as to minimize the quantity of cryptocurrencies, digital currencies, tokens, smart contracts, or public or private keys that could be lost to hacking or unauthorized access.

At step 682, secure computer 310 can receive cryptocurrencies, digital currencies, tokens, smart contracts, or public or private keys deposits in a hot memory module, such as hot memory module 324a (or hot wallet 324a), from a depositing authorized user. Receive/release block 314 can also send a response message confirming receipt.

Figure 7A:
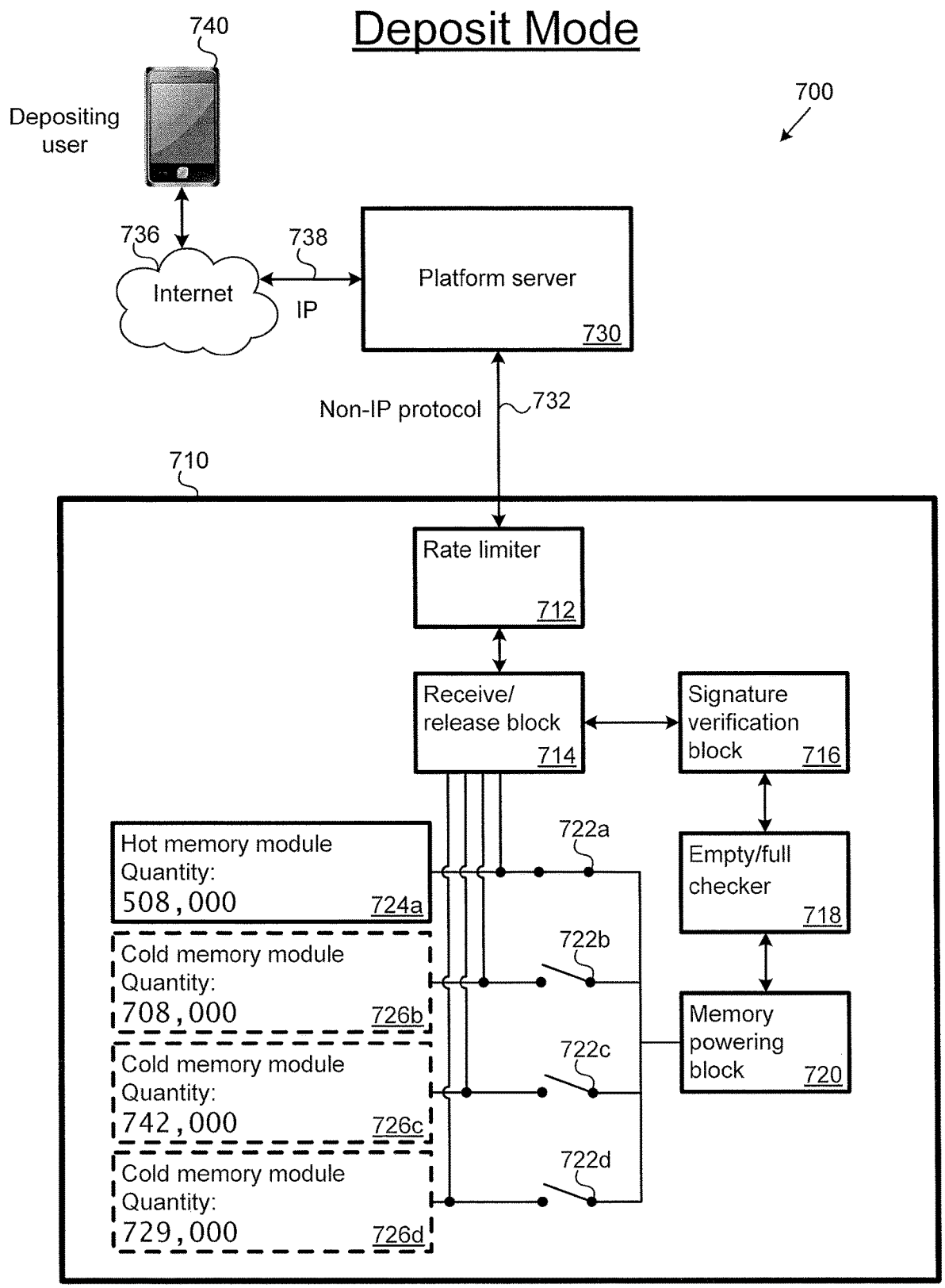
FIGS. 7A, 7B, and 7C each illustrate a diagram of a portion of an exemplary secure electronic system according to one implementation of the present application.
Figure 7B:
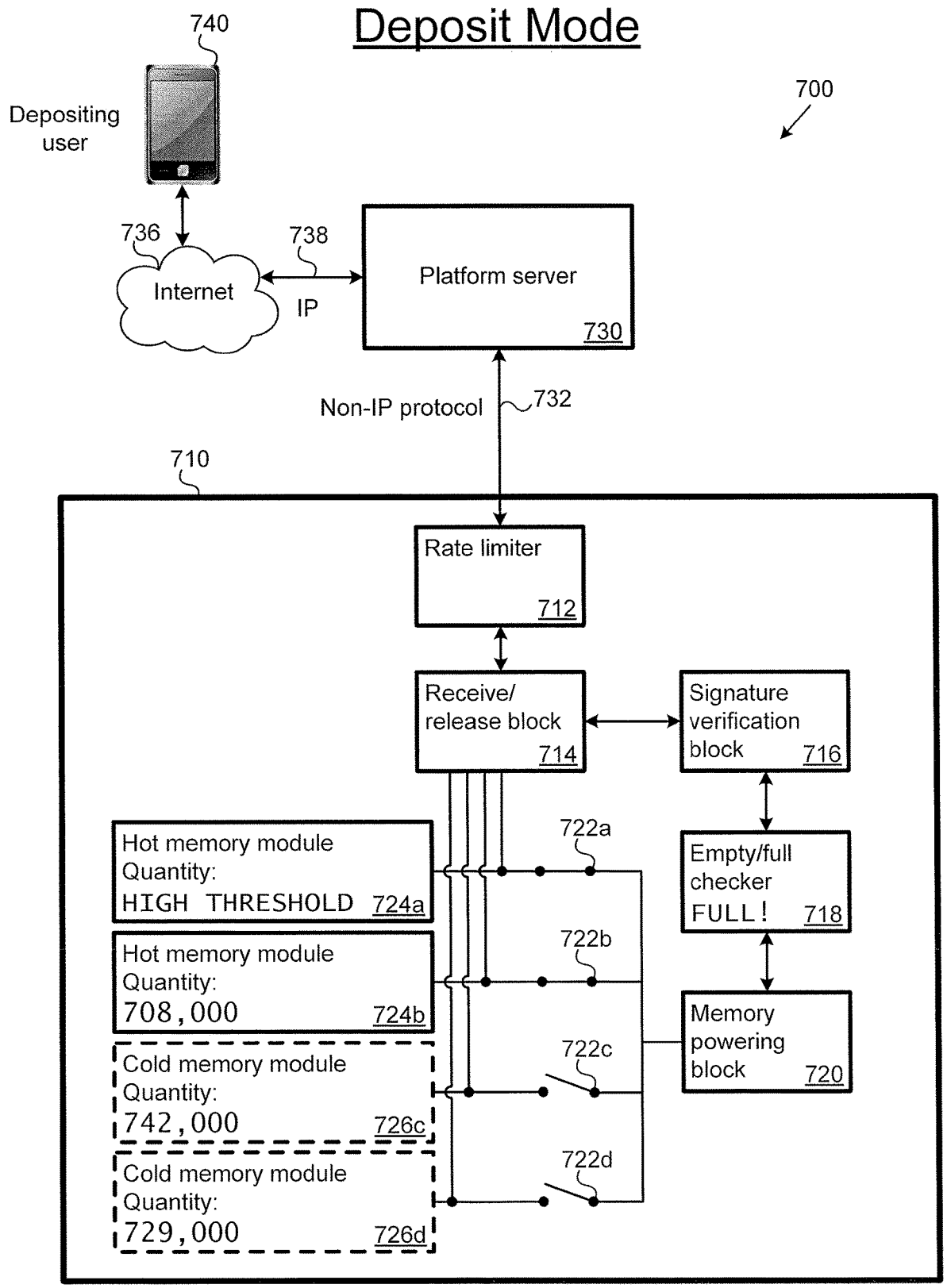
Figure 7C:
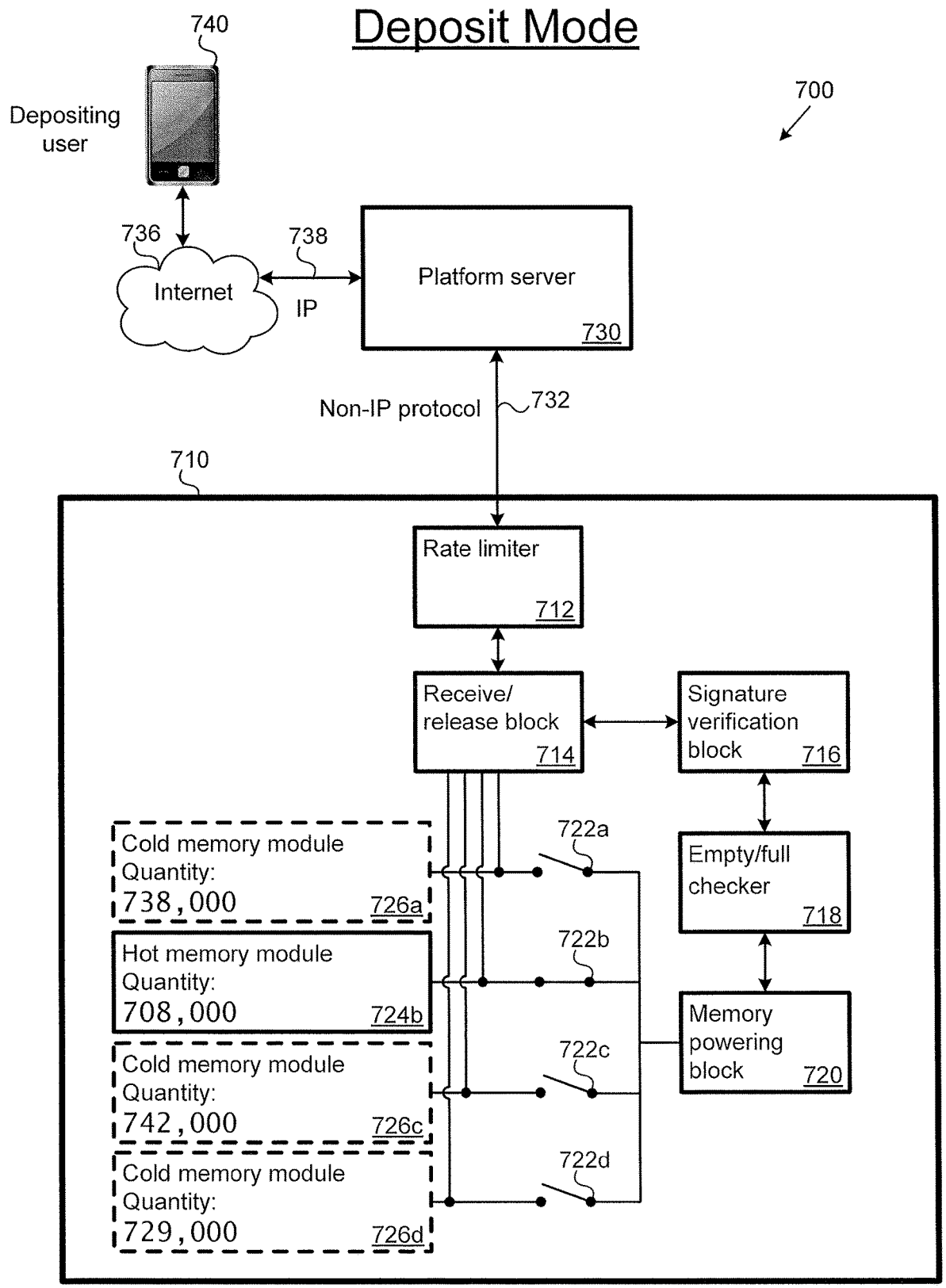

FIGS. 7A, 7B, and 7C each illustrate a diagram of a portion of an exemplary secure electronic system according to one implementation of the present application. As illustrated in FIGS. 7A, 7B, and 7C, secure electronic system 700 includes secure computer 710, platform server 730, secure connection 732, Internet 736, connection 738, and depositing user 740. Secure electronic system 700 in FIGS. 7A, 7B, and 7C generally corresponds to secure electronic system 300 shown in FIG. 3, and may have any of the implementations and advantages discussed above. Secure computer 710 includes rate limiter 712, receive/release block 714, signature verification block 716, empty/full checker 718, memory powering block 720, and switches 722a, 722b, 722c, and 722d, collectively referred to as switches 722.

Secure computer 710 in FIG. 7 generally corresponds to secure computer 310 shown in FIG. 3, and may have any of the implementations and advantages discussed above.

As illustrated in FIG. 7A, secure computer 710 includes hot memory module 724a (or hot wallet 724a), and cold memory modules 726b, 726c, and 726d (or cold wallets 726b, 726c, and 726d). By way of a specific illustrative example, and without in any way limiting the present inventive concepts, hot memory module 724a (or hot wallet 724a) stores a quantity of 508,000 units of cryptocurrencies. Cold memory modules 726b, 726c, and 726d (or cold wallets 726b, 726c, and 726d) store quantities of 708,000 units, 742,000 units, and 729,000 units of cryptocurrencies respectively. As shown in FIG. 7A, memory powering block 720 keeps switch 722a closed, such that hot memory module 724a (or hot wallet 724a) is powered up and cryptocurrencies can be added to or removed from hot memory module 724a (or hot wallet 724a). Meanwhile, memory powering block 720 keeps switches 722b, 722c, and 722d open, such that cold memory modules 726b, 726c, and 726d (or cold wallets 726b, 726c, and 726d) are powered down and cryptocurrencies cannot be added to or removed from cold memory modules 726b, 726c, and 726d (or cold wallets 726b, 726c, and 726d). In the implementation of FIG. 7A, the 508,000 units of cryptocurrencies stored in hot memory module 724a (or hot wallet 724a) is below a high threshold of 700,000 units of cryptocurrencies. If receive/release block 714 approves a request from depositing user 740 for receipt of cryptocurrencies, the cryptocurrencies will be deposited into hot memory module 724a (or hot wallet 724a).

As illustrated in FIG. 7B, secure computer 710 includes hot memory modules 724a and 724b (or hot wallets 724a and 724b), and cold memory modules 726c and 726d (or cold wallets 726c and 726d). By way of continuing the specific illustrative example set forth above, and without in any way limiting the present inventive concepts, FIG. 7B may correspond to FIG. 7A after depositing user 740 deposits a quantity of approximately 230,000 units of cryptocurrencies to hot memory module 724a (or hot wallet 724a). As shown in FIG. 7B, the quantity of cryptocurrencies stored in hot memory module 724a (or hot wallet 724a) is now above a high threshold of 700,000 units of cryptocurrencies. Empty/full checker 718 reports "FULL!" to indicate that it detected an anticipated full condition (as a warning, and not as a literally full indication) from hot memory module 724a (or hot wallet 724a). Memory powering block 720 has closed switch 722b, such that hot memory module 724b (or hot wallet 724b) is powered up and cryptocurrencies can be added to or removed from hot memory module 724b (or hot wallet 724b). Cold memory module 726b (or cold wallet 726b) in FIG. 7A is now depicted as hot memory module 724b (or hot wallet 724b) in FIG. 7B. Cold memory module 726b (or cold wallet 726b) in FIG. 7A had the lowest quantity of cryptocurrencies among all cold memory modules in FIG. 7A. In FIG. 7B, if receive/release block 714 approves a request from depositing user 740 for receipt of cryptocurrencies, the cryptocurrencies will be received to hot memory module 724b (or hot wallet 724b).

As illustrated in FIG. 7C, secure computer 710 includes hot memory module 724b (or hot wallet 724b), and cold memory modules 726a, 726c, and 726d (or cold wallets 726a, 726c, and 726d). By way of continuing the specific illustrative example set forth above, and without in any way limiting the present inventive concepts, FIG. 7C may correspond to FIG. 7A after depositing user 740 deposits a quantity of approximately 230,000 units to hot memory module 724a (or hot wallet 724a). As shown in FIG. 7C, memory powering block 720 has closed switch 722*b*, such that hot memory module 724*b* (or hot wallet 724*b*) is powered up and cryptocurrencies can be added to or removed from hot memory module 724*b* (or hot wallet 724*b*). Cold memory module 726*b* (or cold wallet 726*b*) in FIG. 7A is now depicted as hot memory module 724*b* (or hot wallet 724*b*) in FIG. 7C. Meanwhile, memory powering block 720 has opened switch 722*a*, such that cold memory module 726*a* (or cold wallet 726*a*) is powered down and cryptocurrencies cannot be added to or removed from cold memory module 726*a* (or cold wallet 726*a*). Hot memory module 724*a* (or hot wallet 724*a*) in FIG. 7A is now depicted as cold memory module 726*a* (or cold wallet 726*a*) in FIG. 7C. Hot memory module 724*b* (or hot wallet 724*b*) stores a quantity of 708,000 units of cryptocurrencies. Cold memory modules 726*a*, 726*c*, and 726*d* (or cold wallets 726*a*, 726*c*, and 726*d*) store quantities of 738,000 units, 742,000 units, and 729,000 units of cryptocurrencies respectively. In the implementation of FIG. 7C, the quantity of cryptocurrencies stored in each memory module is now above a high threshold of 700,000 units of cryptocurrencies. Empty/full checker 718 tracks quantities of cryptocurrencies stored in both hot memory modules and cold memory modules. When all memory modules are above a high threshold of 700,000 units of cryptocurrencies, empty/full checker 718 can avoid detecting a full condition in hot memory module 724*b* if the quantity of cryptocurrencies stored in hot memory module 724*b* (or hot wallet 724*b*) is the lowest among all memory modules.

Thus, various implementations of the present application achieve a secure electronic system that overcomes the deficiencies in the art by using several security safeguards. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A secure electronic system for storing and managing receipt and releasing of electronic documents, said secure electronic system comprising:
- a plurality of cold hardware memory modules disconnected from a power source such that a cold quantity of cold electronic documents stored in said cold hardware memory modules cannot be changed;
- at least one hot hardware memory module connected to said power source such that a hot quantity of hot electronic documents stored therein can be changed by said releasing of some of said hot electronic documents to withdrawing authorized users or by said receipt of incoming additional hot electronic documents from depositing authorized users;
- wherein said secure electronic system connects one or more of said plurality of cold hardware memory modules to said power source upon detecting said hot quantity of said hot electronic documents in said at least one hot hardware memory module falling below a low document quantity threshold, so as to provide an additional quantity of said electronic documents for said releasing to said withdrawing authorized users;
- wherein said secure electronic system connects one or more of said plurality of cold hardware memory modules to said power source upon detecting a memory space consumed by said hot electronic documents in said at least one hot hardware memory module rising above a high memory space threshold or said hot quantity of said hot electronic documents in said at least one hot hardware memory module rising above a high document quantity threshold, so as to provide increased memory space for said receipt of said incoming additional hot electronic documents from said depositing authorized users.

2. The secure electronic system of claim 1, wherein said electronic documents are selected from the group consisting of cryptocurrencies, digital currencies, tokens, and smart contracts.

3. The secure electronic system of claim 1, wherein said secure electronic system disconnects said at least one hot hardware memory module from said power source.

4. The secure electronic system of claim 3, wherein said secure electronic disconnects said at least one hot hardware memory module from said power source when said secure electronic system connects said one or more of said plurality of cold hardware memory modules to said power source.

5. The secure electronic system of claim 3, wherein said secure electronic system disconnects said at least one hot hardware memory module from said power source by opening a switch.

6. The secure electronic system of claim 1, wherein said secure electronic system identifies a selected one of said plurality of cold hardware memory modules that has the lowest quantity of cold electronic documents stored therein, and connects said selected one of said plurality of cold hardware memory modules to said power source.

7. The secure electronic system of claim 1, wherein said releasing of said hot electronic documents to said withdrawing authorized users comprises verifying a user cryptographic signature.

8. The secure electronic system of claim 1, wherein said secure electronic system verifies an administrator or officer cryptographic signature prior to connecting said one or more of said plurality of cold hardware memory modules to said power source.

9. The secure electronic system of claim 8, wherein verifying said administrator or officer cryptographic signature comprises recognizing a distress key.

10. The secure electronic system of claim 1, wherein said secure electronic system connects said one or more of said plurality of cold hardware memory modules to said power source by closing a switch.

11. A secure electronic system for storing and managing receipt and releasing of electronic documents, said secure electronic system comprising:
- a platform server that is connected to the Internet through an Internet protocol (IP);
- a secure computer that hosts at least one hot hardware memory module connected to a power source such that a hot quantity of hot electronic documents stored therein can be changed by said releasing some of said hot electronic documents to withdrawing authorized users or by said receipt of incoming additional hot electronic documents from depositing authorized users;

a communication link providing the only external network connection from said secure computer, said communication link connecting said secure computer and said platform server;

said secure computer including a network interface controller that restricts communications over said communication link to said releasing some of said hot electronic documents from said least one hot hardware memory module using a non-IP protocol and said receipt of said incoming additional hot electronic documents from said depositing authorized users using said non-IP protocol;

said non-IP protocol being known only to authorized administrators or operators of said secure electronic system.

12. The secure electronic system of claim 11, further comprising:

said secure computer hosting a plurality of cold hardware memory modules disconnected from a power source such that a cold quantity of cold electronic documents stored in each cold hardware memory module cannot be changed;

wherein said secure computer connects one or more of said plurality of cold hardware memory modules to said power source upon detecting said hot quantity of said hot electronic documents in said at least one hot hardware memory module falling below a low document quantity threshold, so as to provide an additional hot quantity of said electronic documents for said releasing to said withdrawing authorized users;

wherein said secure computer connects one or more of said plurality of cold hardware memory modules to said power source upon detecting a memory space consumed by said hot electronic documents in said at least one hot hardware memory module rising above a high memory space threshold or said hot quantity of said hot electronic documents in said at least one hot hardware memory module rising above a high document quantity threshold, so as to provide increased memory space for said receipt of said incoming additional hot electronic documents from said depositing authorized users.

13. The secure electronic system of claim 12, wherein said secure electronic system connects said one or more of said plurality of cold hardware memory modules to said power source by closing a switch.

14. The secure electronic system of claim 11, wherein said electronic documents are selected from the group consisting of cryptocurrencies, digital currencies, tokens, and smart contracts.

15. The secure electronic system of claim 11, wherein said secure electronic system only runs software written by said authorized administrators or operators.

16. The secure electronic system of claim 11, wherein said at least one hot hardware memory module is connected to said power source via a switch.

* * * * *